Nov. 15, 1966  H. E. JACKSON  3,285,233
FUEL INJECTION SYSTEMS

Filed Aug. 10, 1965  16 Sheets-Sheet 1

INVENTOR
H. E. Jackson
BY
ATTORNEY

Nov. 15, 1966   H. E. JACKSON   3,285,233
FUEL INJECTION SYSTEMS
Filed Aug. 10, 1965   16 Sheets-Sheet 2

INVENTOR
*H. E. Jackson*
BY
ATTORNEY

Nov. 15, 1966  H. E. JACKSON  3,285,233
FUEL INJECTION SYSTEMS
Filed Aug. 10, 1965  16 Sheets-Sheet 3

INVENTOR
H. E. Jackson
BY
ATTORNEY

Nov. 15, 1966 H. E. JACKSON 3,285,233
FUEL INJECTION SYSTEMS
Filed Aug. 10, 1965 16 Sheets-Sheet 5

INVENTOR
*H. E. Jackson*
BY
ATTORNEY

Nov. 15, 1966  H. E. JACKSON  3,285,233
FUEL INJECTION SYSTEMS
Filed Aug. 10, 1965  16 Sheets-Sheet 8

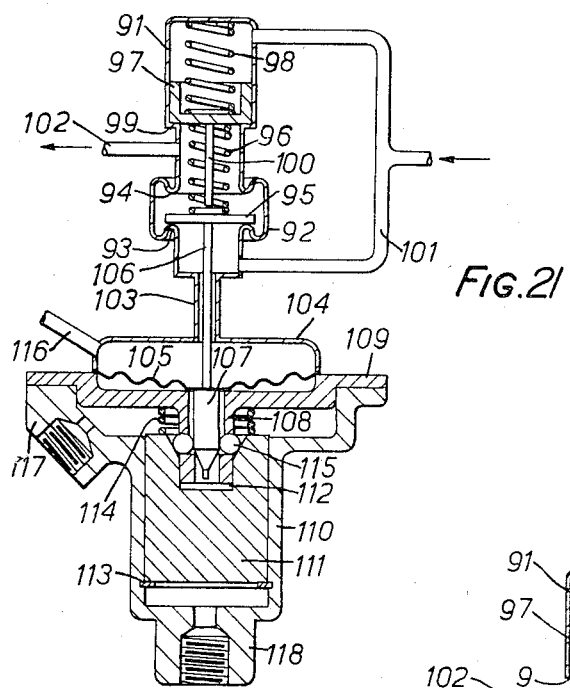
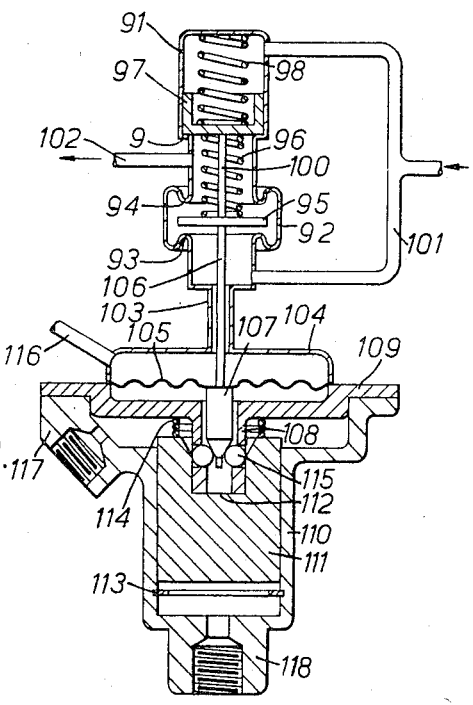

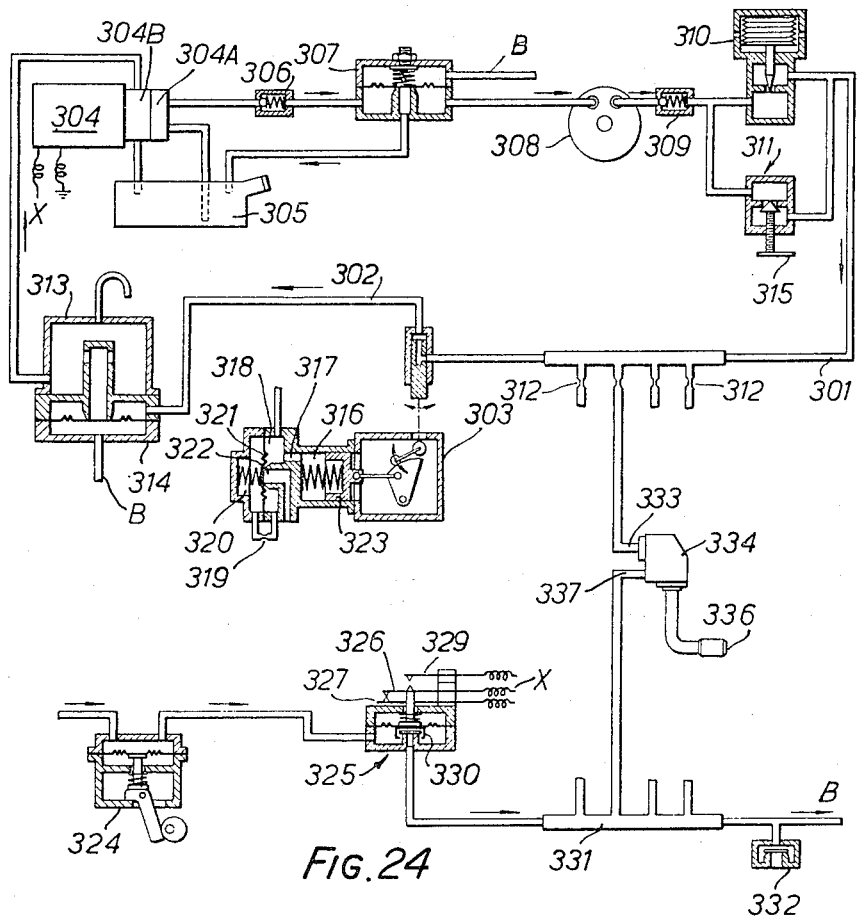
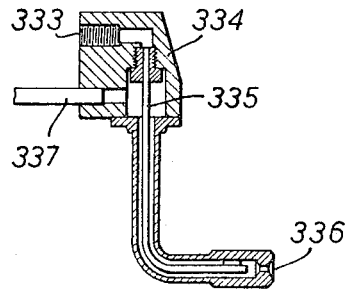
FIG. 25
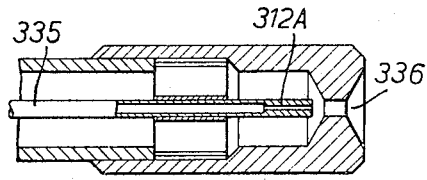
FIG. 25a
FIG. 24

Nov. 15, 1966  H. E. JACKSON  3,285,233

FUEL INJECTION SYSTEMS

Filed Aug. 10, 1965  16 Sheets-Sheet 15

3,285,233
Patented Nov. 15, 1966

3,285,233
FUEL INJECTION SYSTEMS
Harold Ernest Jackson, Plympton St. Mary, Devon, England, assignor of one-half to Petrol Injection Limited, Plymouth, Devon, England, a British company
Filed Aug. 10, 1965, Ser. No. 482,994
Claims priority, application Great Britain, Dec. 21, 1962, 48,479/62; Feb. 25, 1964, 7,895/64; June 24, 1964, 26,173/64
49 Claims. (Cl. 123—139)

This invention relates to continuous fuel injection systems for internal combustion engines and particularly to such systems which include air atomising open injector devices from which atomised fuel is continuously sprayed at low pressures into passageways leading from the engine inlet manifold to the engine cylinders, being admitted to the cylinders on opening of the inlet valve to the cylinder concerned.

It is a general object of this invention to provide a continuous fuel injection system for an internal combustion engine in which fuel, metered in dependence on engine operating requirements, and atomising air are supplied to open, air atomising injector devices at pressures lower than has previously been considered practicable. The precise pressures used are capable of variation but typically the fuel pressure may vary, in dependence on engine operation, over the range of a few p.s.i. to a hundred or so p.s.i. while the atomising air pressure may be of the order of a few p.s.i. to a few tens of p.s.i. The fuel and atomising air are mixed in the injector device, the atomised fuel being discharged at a pressure comparable to that of the atomising air, in a particular example at 2–3 p.s.i. References in the following description and claims to low pressures of fuel, air and fuel/air mixture are intended to be construed in this general sense.

It is also an object of the invention to provide such a fuel injection system in which fuel is continuously circulated around a ring conduit, the necessary amount of fuel for the engine operating requirements being metered to the injector devices and the surplus fuel returned to the fuel tank of the engine. This continuous circulation aids cooling of the system and since the atomised fuel is discharged into the passageways leading from the inlet manifold to the engine cylinders, a degree of fuel vaporisation takes place prior to opening of the inlet ports, the rate of vaporisation being determined by controlling the size of the atomised fuel droplets.

It is another object of the invention to provide such a fuel injection system in which the fuel flow around the fuel ring main is opposed both in the supply and return branches thereof by atomising air pressure so that metering of the fuel is independent of the atomising air pressure and any variations in such pressure.

It is also an object of the invention to provide in such a fuel injection system vacuum relief valve means so connected in the air supply line to the atomiser devices that fuel discharge therefrom is not adversely affected by engine inlet manifold vacuum, to which the open injector devices are exposed, the vacuum relief valve means ensuring that pressure within the injector devices is maintained at least at atmospheric pressure.

A further object of the invention is to provide a continuous low pressure fuel injection system in which open air-atomising injector devices can be used which are of simple but efficient construction.

A more particular object of the invention is to provide a continuous low pressure fuel injection system in which fuel metering is achieved, at least in part, by varying fuel supply pressure in dependence on engine operating speed and varying a metering valve orifice in dependence on at least engine air intake flow conveniently represented by engine throttle opening or by engine inlet manifold vacuum level. Response to engine throtttle opening may be achieved by a mechanical coupling to the throttle control and to the inlet manifold vacuum either directly or by measurement of pressure drop across a venturi device located in the manifold.

It is also an object of the invention to provide a continuous low pressure fuel injection system that is capable of economical construction combined with efficient operation and adaptable for incorporation into mass produced engines as well as in more specialised high performance engines such as are used in racing cars.

A particular low pressure continuous fuel injection system for an internal combustion engine, having open air-atomising fuel injector devices having outlet orifices for location in passageways leading from the engine inlet manifold to the engine cylinders, has, according to this invention, a fuel supply conduit comprising supply and return branches and a pump device for circulating fuel around the conduit. The injector devices are connected to the supply branch of the fuel conduit and a fuel metering valve (which may be located either in the supply branch upstream of the injector devices or in the return branch downstream of the injector devices) meters fuel to the injector devices. The fuel metering is dependent at least on engine operating speed, preferably by adjusting fuel pressure in the supply conduit by means of an engine speed responsive device, and on engine air intake flow, conveniently achieved by varying the area of a metering orifice either in dependence on the engine throttle valve opening or in dependence on the engine inlet manifold vacuum. The system also has means for supplying atomising air at a low positive pressure to the injector devices for mixing with fuel prior to discharge of the atomised fuel at low pressure, substantially equal to atomising air pressure. The atomising air presure is also used to control a fluid pressure responsive valve in the return branch of the fuel conduit so that fuel flow in both the supply and return branches is opposed by the atomising air pressure, the flow in the supply branch being opposed by the atomising air pressure in the injector devices. In particular, the metering means can comprise a valve actuable in response both to engine operating speed and engine throttle opening, and may have a valve member operable in response to linear or/and rotary movement of a three-dimensional cam. The cam can be coupled to the engine throttle linkage for rotation thereof in response to throttle opening and for response to engine opertaing speed may be coupled, for example by a fluid pressure operable servomechanism, to a diaphragm exposed to the engine speed dependent fuel pressure in the supply branch of the fuel conduit whereby flexure of the diaphragm in response to fuel pressure changes causes linear movement of the cam.

In another embodiment of the invention having a fuel ring main comprising supply and return branches and open air-atomising injector devices connected to the supply branch, an engine driven pump device is arranged to supply fuel from the supply branch to the injector devices at a pressure dependent on engine speed. The ring main also includes a metering valve device controllable in response to engine air intake flow (e.g. by actuation in response to engine throttle opening or engine inlet manifold vacuum) for adjusting fuel supply to the injector devices. The metering valve device can be located in either the supply or return branches of the ring main. The system also includes pumping means for supplying atomising air to the injector devices and for controlling a flow balance valve in the return branch of the fuel ring main as mentioned in the preceding paragraph. In addition, there is connected to the atomising air line, adjacent its communication with the injector devices, a vacuum relief valve device which ensures that air pressure within the injector devices is always equal at least to atmospheric pressure and hence that the inlet manifold vacuum, to which the interiors of the open injector devices are exposed, does not adversely affect fuel discharge from the injector devices.

Preferably, the system referred to in the preceding paragraph includes a priming pump for supplying fuel at a low standing pressure to the engine driven pump device, a check valve device being included in the fuel supply branch upstream of the injector devices to remove this standing pressure so that the pressure of fuel supplied to the injector devices is directly dependent on engine speed. In a particular embodiment, the engine driven pump device can be of the type which pressurises the fuel by conversion of velocity energy to pressure energy. The return branch can also include fuel collection tank from which fuel is returned to a fuel supply tank by a scavenge pump device. The fuel priming and scavenge pumps can each be of a single impeller-type, having rotors driven by a common driving shaft and mounted in a common housing.

The fuel supply branch is connected to the injector devices preferably by flow equalising restrictors consisting of precision drawn fine-bore tubes of constant diameter, desired flow characteristics being obtained by variations of the lengths of the tubes. Using such tubes, rather than drilled jets, a very close tolerance typically 1% can be obtained on the flow characteristics.

The injection systems described above can include one or more optional features. These include an acceleration response device operable in response to rapid throttle opening or rapid increase in inlet manifold pressure, i.e. decreasing manifold vacuum, temporarily to supplement fuel supply to the injector devices so to prevent lagging of engine response. In embodiments utilising a metering valve operable in response to engine inlet manifold pressure, which includes a control device exposed to such pressure, the acceleration response device can be operable temporarily to expose the control device to atmospheric pressure so that the valve is operated to supplement the fuel supply to the injector devices. Preferably, the acceleration response device is adjustable to control the period of fuel supplementation.

The system can also include a valve device operable to adjust fuel supply to the injector devices to compensate for atmospheric pressure changes, such valve device may be preset if substantial changes in atmospheric pressure are not likely, or can be controlled by a pressure sensitive device if substantial changes in atmospheric pressure are likely, i.e. in mountainous terrains.

In addition, the ring main can include a cold start valve device, operable manually or automatically, to boost fuel supply to the injector devices when starting the engine from cold.

The injector devices preferably are of a simple construction comprising a fuel chamber from which extends a fuel guide tube surrounded by a further tube, connected to an air chamber, having an outlet orifice. The fuel guide tube terminates short of the outlet orifice so that emergent fuel is entrained by the atomising air and ejected from the outlet orifice at substantially atomising air pressure in the form of droplets. Such injector devices are disclosed in the specification of my co-pending application Serial No. 434,417, filed February 23, 1965.

In use of fuel injection systems embodying the invention, the injector devices are disposed in branch tubes connecting the engine inlet manifold to the inlet ports of the respective engine cylinders. Atomised fuel is thus discharged continuously at low pressure into the branch tubes so that some degree of pre-vaporisation occurs. The rate of vaporisation can be controlled by the size of the fuel droplets emergent from the injector devices.

Fuel is continuously circulated through the ring main at a relatively high rate at a pressure dependent on engine speed. The circulation rate is highest for any speed when engine loading is light and the system thus tends to be self-cooling. Fuel flow in both the supply and return branches of the ring main takes places under balanced conditions being referred at all points to atomising air pressure.

Fuel injection systems embodying the invention can be incorporated in engines having power outputs over the approximate range 50–350 B.H.P. with only minor modification. Fuel injection systems embodying the invention can be designed that are economical and simple to construct yet efficient and versatile in operation.

For a more complete understanding of the present invention, and for further objects and advantages thereof, reference may now be had to the following description taken in conjunction with the accompanying drawings in which.

Figure 1:
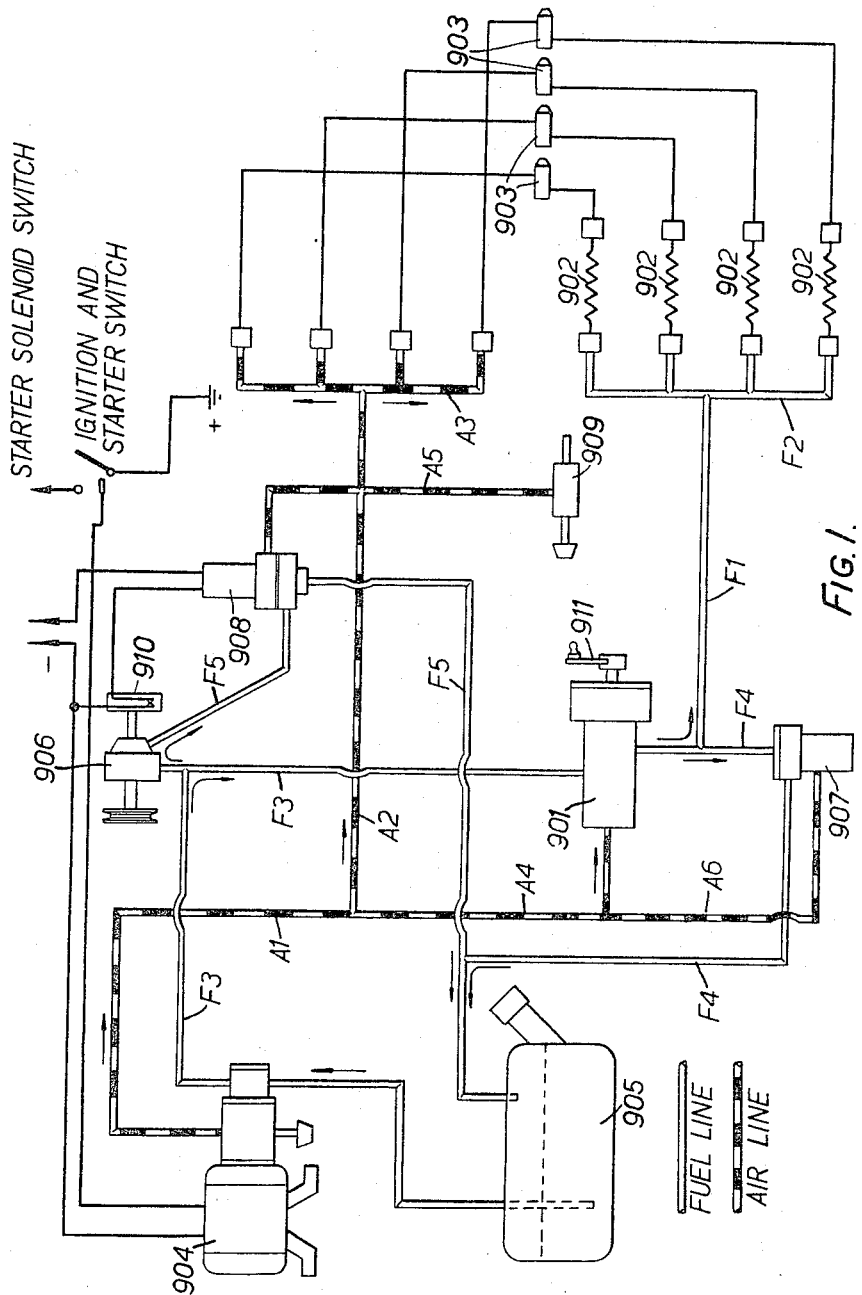
FIG. 1 shows the general arrangement of a system embodying the invention.
Figure 3:
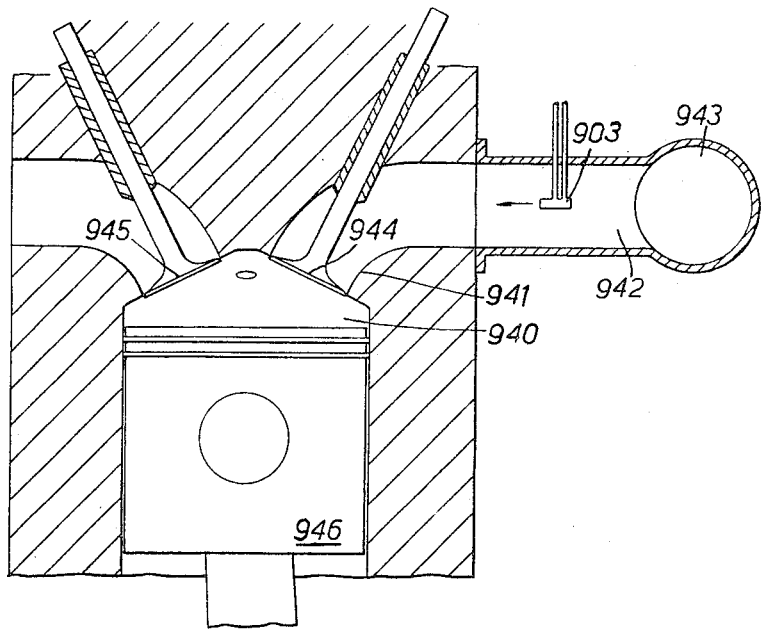
Figure 4:
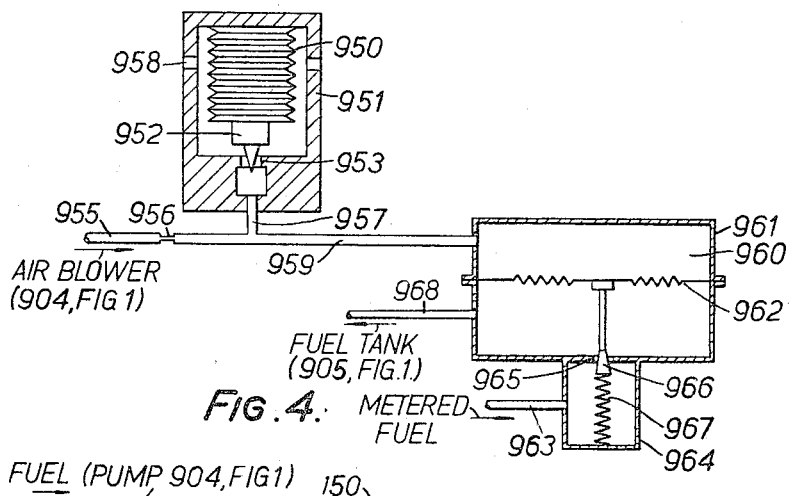
Figure 5:
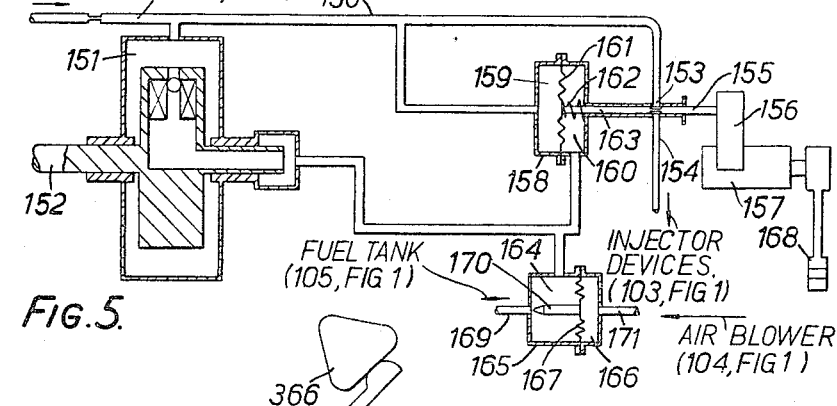
Figure 6:
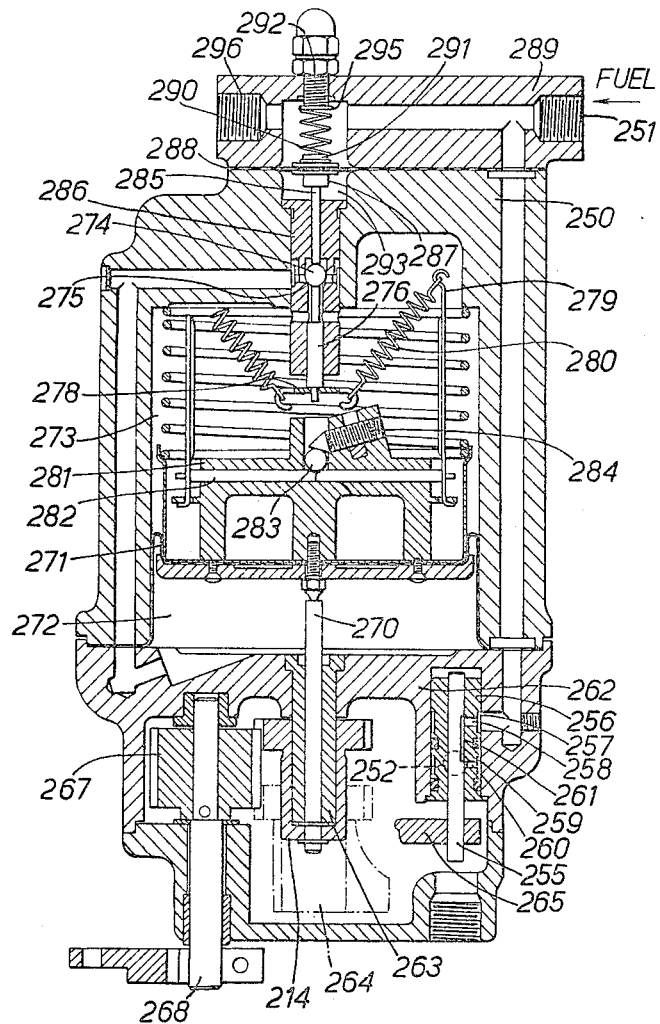
Figure 7:
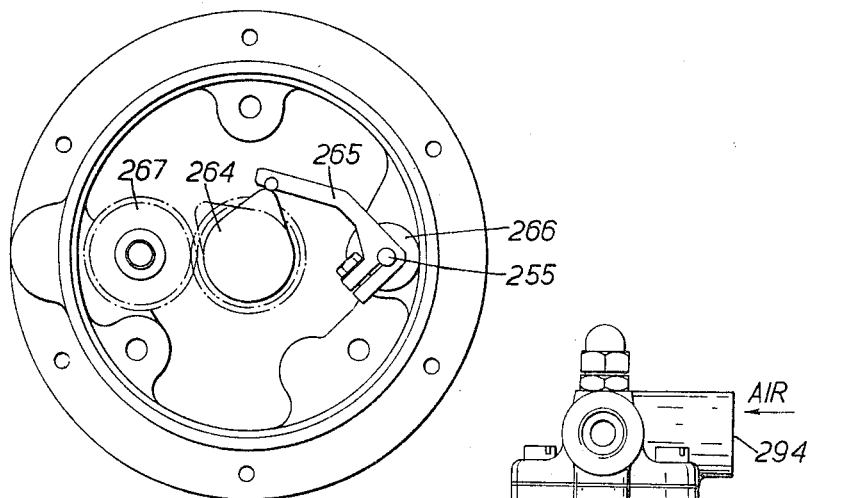
Figure 8:
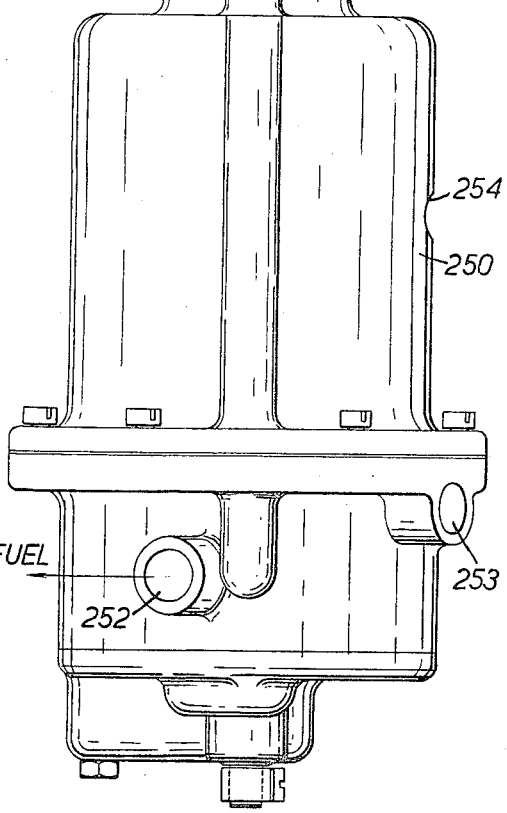

FIG. 3 illustrates the manner of disposition of the atomiser devices of the system shown in FIG. 1 in an engine, FIG. 4 shows a component part of FIG. 1 in greater detail, FIG. 5 shows schematically one form of metering valve and control means suitable for use in a system embodying the invention, FIG. 6 is an axial section of a metering valve and control means, FIG. 7 is an end view of FIG. 6 with the lower end cap removed, FIG. 8 is a side view of FIG. 6, and FIGS. 9 to 12 show schematically alternative metering valve and control means arrangements.

Figure 13:
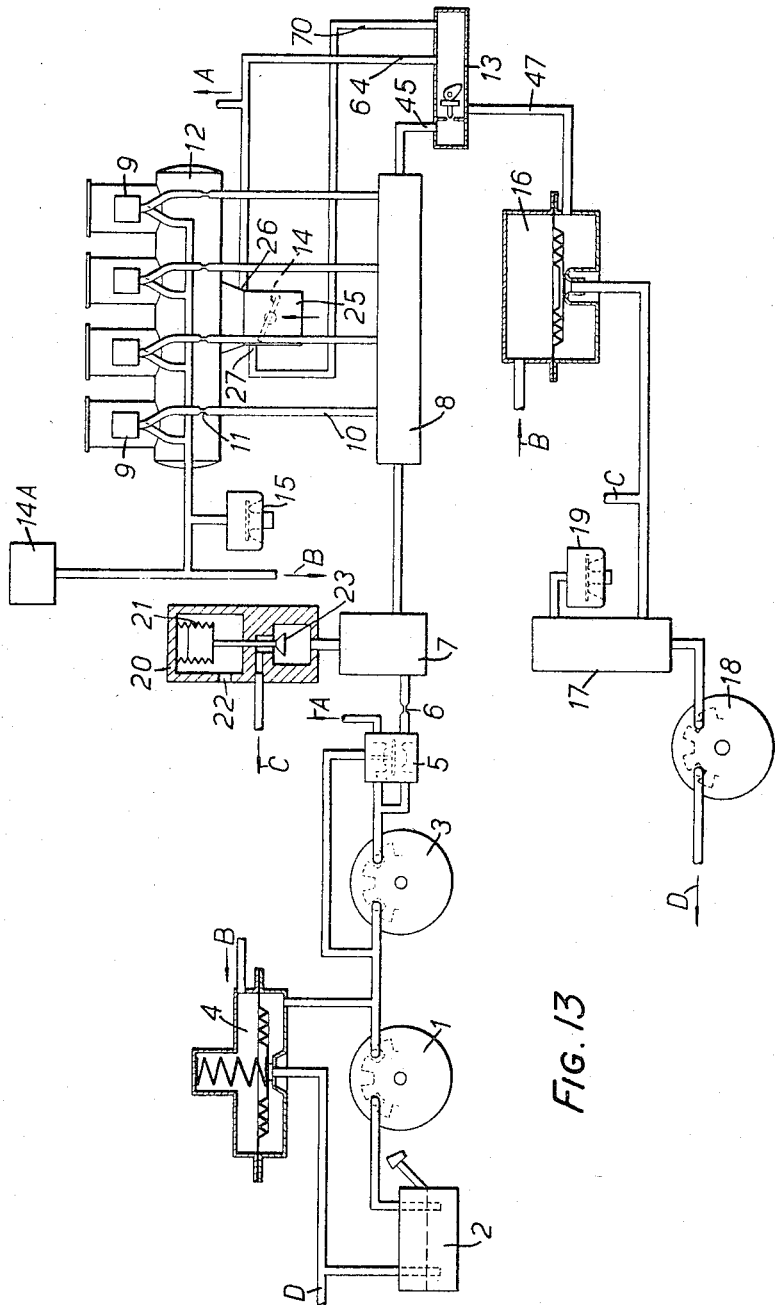
Figure 14:
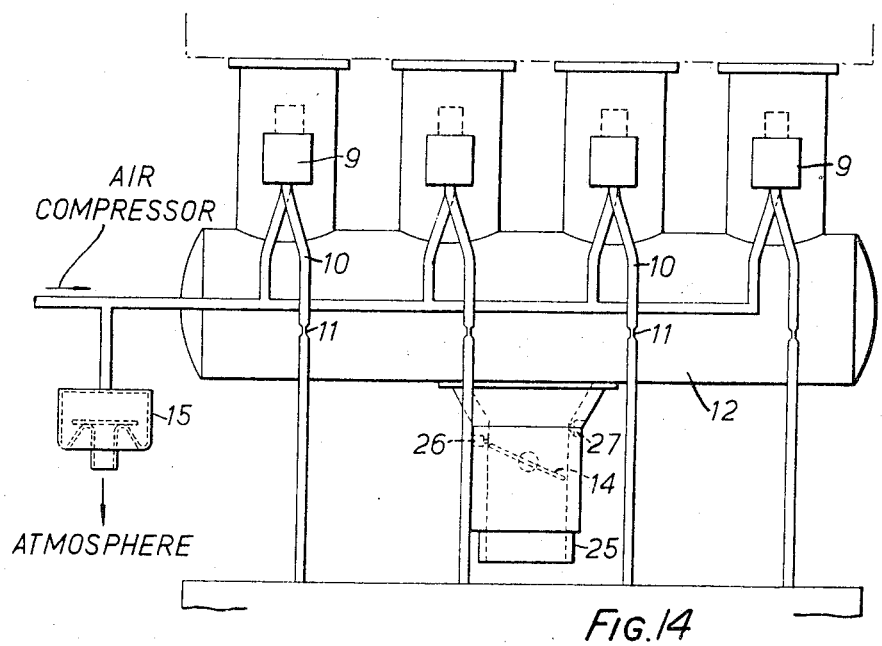
Figures 15, 20:
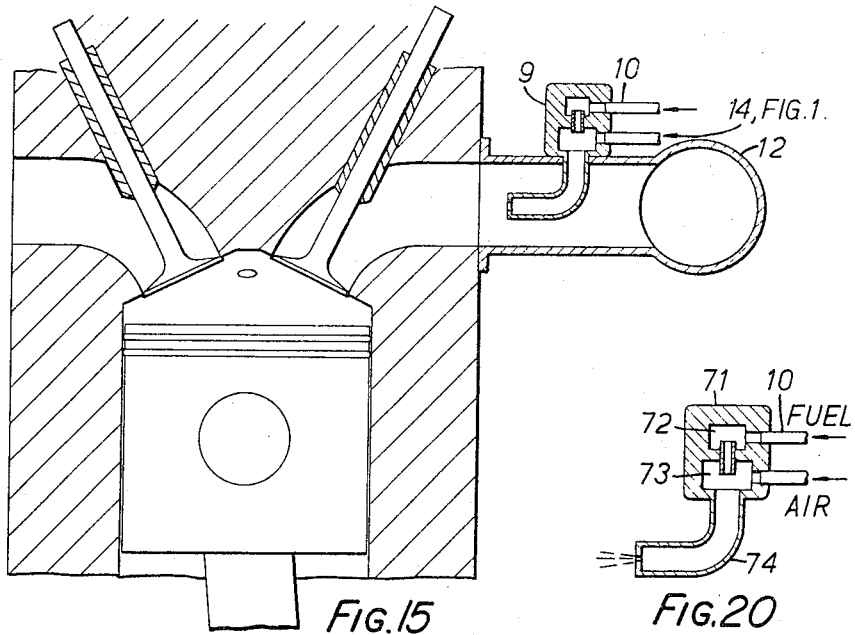
Figure 16:
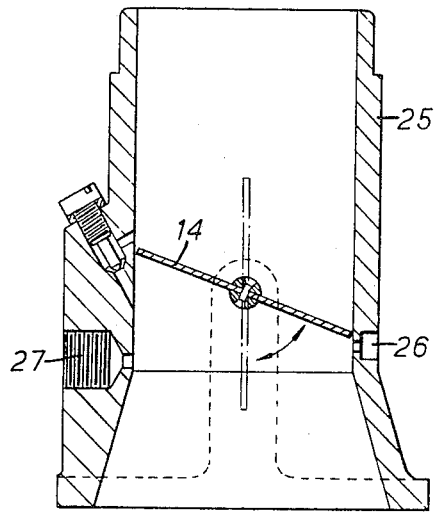
Figure 17:
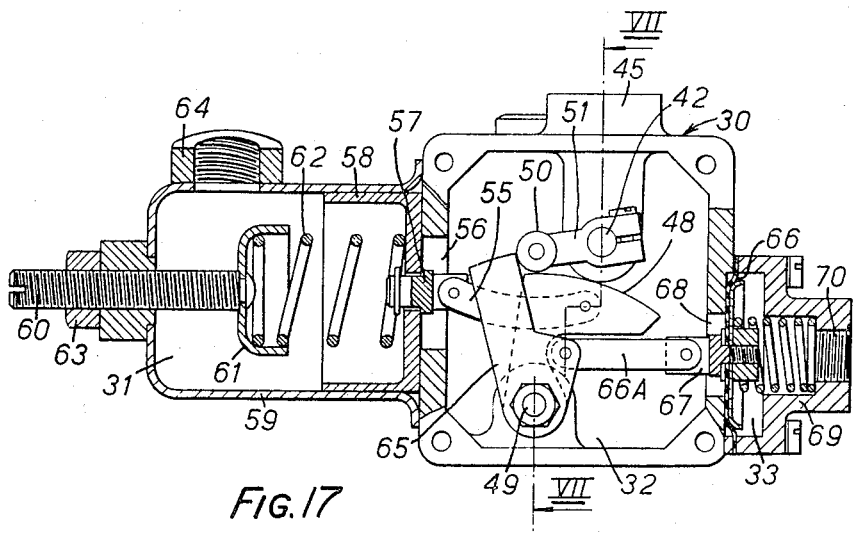
Figure 18:
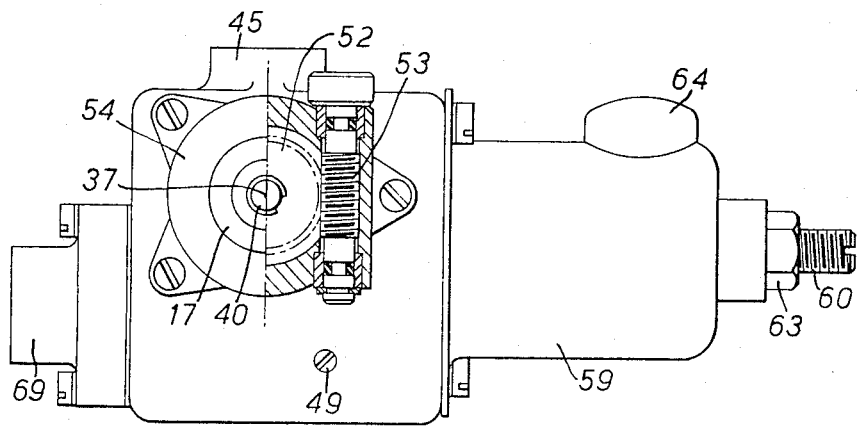
Figure 19:
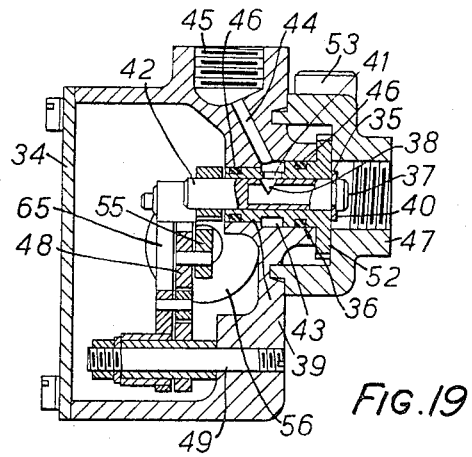
Figure 23:
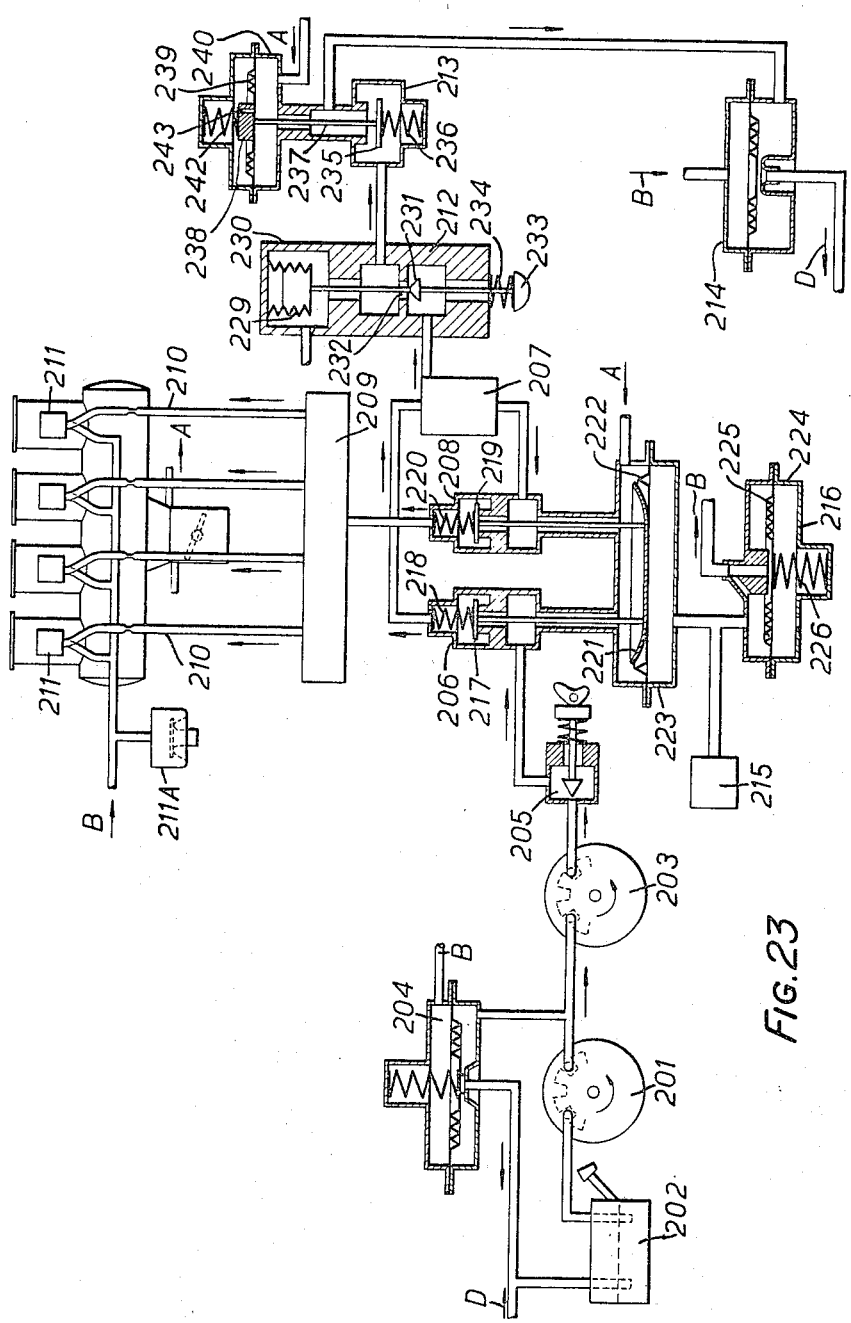
Figure 26:
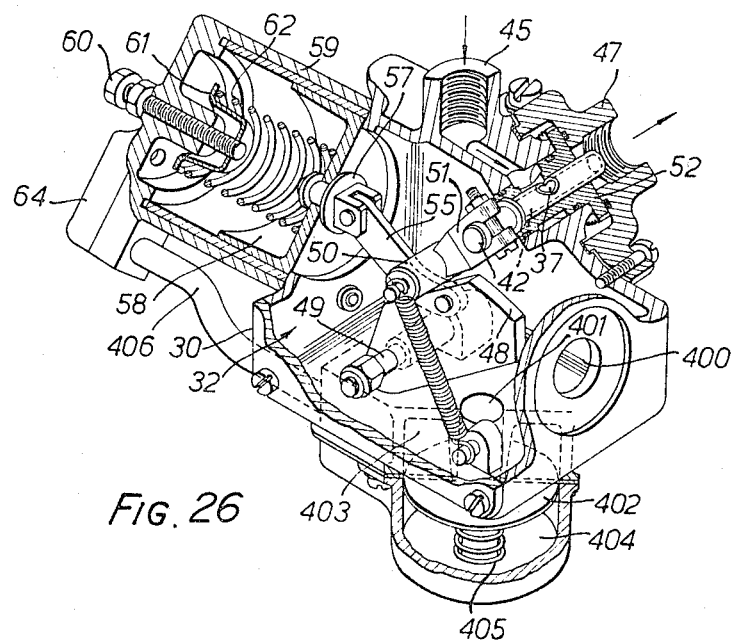
Figure 27:
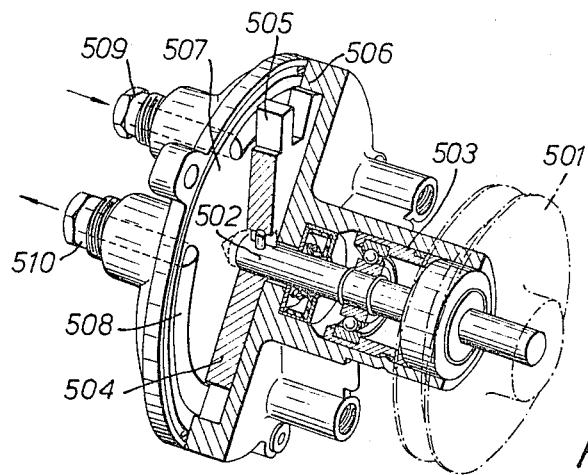

FIG. 13 shows schematically a second embodiment of a fuel injection system according to the invention, FIG. 14 is a plan view of part of FIG. 13, illustrating that part in more detail, FIG. 15 is a sectional detail showing the location of an injector device in the engine inlet manifold, FIG. 16 is a section of the throttle control valve shown in FIGS. 13 and 14, FIG. 17 is a partly sectioned elevation of one side of the fuel metering control valve shown in FIG. 13, FIG. 18 is a similar view as FIG. 17 but of the opposite side of the metering valve, FIG. 19 is a cross-section on the line of VII—VII in FIG. 17, FIG. 20 shows in greater detail the injector device illustrated in FIG. 15, FIGS. 21 and 22 are sectional elevations of the starting and overrun control valve shown in FIG. 13, showing the valve in different positions, FIG. 23 shows schematically a third embodiment of a fuel injection system according to the invention, FIG. 24 is a schematic illustration of a fourth and preferred embodiment of a fuel injection system according of the invention, FIG. 25 is a sectional elevation of an injector device, FIG. 25A is an enlarged scrap section of the outlet end of FIG. 25, showing a modified construction thereof, FIG. 26 is a cut-away view of a practical construction of the metering valve shown in FIG. 24, FIG. 27 is a partly cut-away view of a practical construction of engine driven impeller suitable for use in the systems shown in FIGS. 13, 23 and 24, FIGS. 28 and 29 are part sectional elevation and end views, respectively, of combined fuel priming and scavenge pumps suitable for use in the systems of FIGS. 13, 23 and 24, FIGS. 30 and 31 are sectional elevations of a combined fuel collection chamber and air balance valve suitable for use in the systems of FIGS. 13, 23 and 24 and FIGS. 32 and 33 are sectional elevations of combined atmospheric compensation and cold start valves shown in FIG. 24.

FIG. 1 shows diagrammatically the layout of a fuel injection system for a four cylinder internal combustion petrol engine. The system includes a petrol metering valve 901 arranged to supply petrol through a conduit F1 to a manifold F2 from which flow restrictor devices 902 lead to the fuel chambers of four low-pressure open injector devices 903, associated with the respective cylinders of the engine. An electrically driven centrifugal fuel pump and air blower 904 supplied petrol from a tank 905 through a conduit F3 to the metering valve 901, the pressure of the petrol fed to the metering valve being controlled by a centrifugal relief valve 906 driven from the engine so that the petrol pressure in the conduit F3 is proportional to the square of engine speed. A barometric compensation by-pass valve 907 is connected in a conduit F4 extending from the conduit F1 to the tank 905 and serves to adjust the amount of petrol fed from the metering valve 901 to the atomiser devices 903 in dependence on the mass of air inducted into the cylinders during the induction cycles of the engine, which will vary with the pressure and temperature of the air intake into the engine inlet manifold. A petrol return conduit F5 from the relief valve 906 also is connected to the tank 905 by a combined petrol flow inhibiting solenoid valve and air pressure balance valve 908.

The fuel feed arrangement for the injector devices 903 thus is in the form of a ring circuit having a supply branch comprising series connected conduits F1, F2, F3 (the metering valve 901 being located in this branch upstream of the injector devices) and a return branch comprising parallel connected conduits F4, F5 (through which fuel surplus to the engine operating requirements is returned to the tank 905).

The pump 904 also supplies air through conduits A1 and A2 and a manifold A3 to air chambers of the atomisers 903, through a conduit A4 to the metering valve 901, through a conduit A5 to the air pressure balance valve 908 and through a conduit A6 to the barometric compensation valve 907; also connected to the air conduit A2 is an air pressure and vacuum relief valve 909.

The vacuum relief function of the valve 909 prevents the inlet manifold vacuum, to which the interiors of the injector devices are exposed, from adversely affecting fuel discharge from the injector devices, the vacuum relief valve ensuring that air pressure at least equal to atmospheric pressure always exists in the injector devices.

The solenoid of the valve 908 is connected in the electrical circuit of the engine by a centrifugal switch 910 operable by the drive of the relief valve 906. The air pressure balance valve 908 operates to adjust the resistance to return fuel flow through the conduit F3 in dependence on air pressure supplied to the injector nozzles 903 so that the return fuel flow and the fuel flow to the injector nozzles take place against substantially equal pressures.

The metering valve 901 has a linkage 911 for connection to the engine throttle control which, together with the pressure of the petrol supply to the metering valve 901, determined by the relief valve 906, determines the volume of petrol supplied by the metering valve to the injector devices 903. Fuel is thus metered to the injector devices in dependence on engine operating speed and engine air intake flow.

Figure 2:
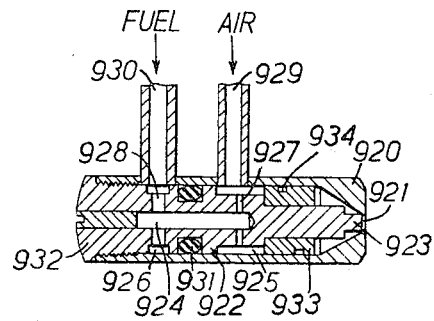
FIG. 2 shows an atomiser device suitable for use in the system shown in FIG. 1.

A suitable form of atomising injector device is shown in FIG. 2. The device is an open injector suitable for operation at nozzle pressures of petrol and air of a few pounds per square inch (p.s.i.) and has a hollow cylindrical body portion 920 formed at one end with an injection nozzle 921. Secured within the body portion 920 is a plug 922 formed with a shaped boss 923 whose forward end, together with the nozzle 921, defines an annular orifice. The plug has an axial drilling 924 extending along part of its length towards the boss 923 and the drilling is connected to peripheral recesses 925 and 926 in the plug by passages 927 and 928 respectively. The recess 925 registers with an air inlet conduit 929 which extends through the wall of the body portion 920 whilst the recess 926 registers with a similarly formed petrol inlet 930. Leakage between the recesses 925 and 926 along the interface of the bore of the body 920 and of the plug 922 is prevented by an O-ring 931 and the open end of the drilling 924 is closed by a screw 932. Mounted on the boss 923 is a member 933 which closely fits the bore of the body portion 920. The member 933 has helical peripheral grooves 934 which extend along its whole length.

In use of such injector devices in the system shown in FIG. 1, the air line manifold A3 is connected to the conduits 929 and the petrol manifold F2 is connected through the restrictor devices 902 to the conduits 930. The metering valve 901 is controlled by the air supply in such manner that the petrol pressure exceeds that of the air supply by an amount sufficient to prevent back-flow of air from the recess 925 of an injector device 903, along the drilling 924 to the recess 926. The petrol passes from the recess 926 through the passage 928 along the drilling 924 into the recess 925 which also is supplied with air and the mixture then passes along the peripheral grooves 934 in the member 933 causing the mixture to rotate. The mixture leaves the grooves in the form of a swirl and passes from the annular injection orifice of the injector nozzle 921 as a fine petrol/air spray. In operation, the petrol and air pressures in the nozzle devices are of the order of a few pounds per square inch. The injector devices are disposed in the manner illustrated by FIG. 3, which shows the location of one of the devices with respect to its associated engine cylinder. The cylinder 940 has an inlet port 941 connected by a conduit 942 to an inlet manifold 943, common to all four cylinders, having a throttle control arrangement, as is normal. The inlet port has an inlet valve 944 which, together with the inlet valves of the other cylinders, is driven by the normal common timing mechanism so that each inlet port is opened sequentially and in desired order. The injector device 903, shown in FIG. 3, is disposed in the conduit 942, with its orifice directed towards the inlet port 941, atomised petrol issuing from the injector device being drawn into the cylinder 940 when the inlet valve 944 is opened. The cylinder 940 has also the usual exhaust valve 945 and piston 946.

In the system described with reference to FIGS. 1–3, petrol from the pump 904 is metered by the metering valve 901 in dependence with engine speed and engine air intake flow (throttle opening) and supplied to the petrol inlets 930 of the injector devices 903, air from the blower 904 being supplied to the air inlets 929 of the injector devices 903. The atomised mixture which issues from the injection orifices of the injector devices is drawn into the respective cylinders during the induction cycles and ignited in conventional manner. The ignition and timing mechanism of the engine may be of conventional design.

A suitable form of barometric componensation by-pass valve 907 is illustrated diagrammatically by FIG. 4. The valve 907 comprises a flexible bellows 950 which contains fluid at less than atomspheric pressure, being secured at its upper end to a housing 951 and carrying at its lower end a valve member 952 which co-acts with an orifice 953. Air under pressure, from the conduit A6 shown in FIG. 1, flows through a conduit 955 and restriction 956 to a conduit 957 through which it passes to the orifice 953 and thence through vents 958 to atmosphere. The air also flows through a conduit 959 to the upper compartment 960 of a chamber 961 divided into upper and lower compartments by a resilient diaphragm 962. Fuel from the conduit F1 is led via conduit F4 (FIG. 1) through a conduit 963 to a chamber 964 at the upper end of which is an orifice 965 having a co-operating valve member 966 dependent from the diaphragm 962 and urged upwards towards a closed position by a spring 967. The position of the valve 966 within the orifice 965 is determined by the air pressure in the upper compartment 960 of the chamber 961 acting on the diaphragm 962 in opposition to the spring 967, and the air pressure in the compartment 960 is controlled by the escape of air through the orifice 953 and the vents 958. In operation, the bellows 950 is exposed to the air entering the engine intake manifold 943 (FIG. 3) and changes in temperature and pressure of that air will cause alterations in length of the bellows 950 and therefore in the position of the valve member 952 within the orifice 953, e.g. if the engine inlet air temperature rises the bellows 950 will expand causing the valve member 952 to move further into the orifice 953 and so raise the pressure in the compartment 960. Such an increase in pressure in the compartment 960 will force the valve 966 downwards within the orifice 965 so allowing more fuel to be by-passed, via a conduit 968 connected to the conduit F4 (FIG. 1) to the tank 905. This satisfies the requirement created by the fact that when the engine is drawing in air at a higher than normal temperature the weight of air inducted by the engine is less than normal and therefore it requires less fuel.

FIG. 5 shows schematically the layout of a metering valve 901 and control means therefor, suitable for use in the system shown in FIG. 1.

Fuel from the fuel pump 904 is supplied from the conduit F3 (FIG. 1) via a restriction to a conduit 150, to which is connected a centrifugal relief valve 151 (6, FIG. 1) whose driving shaft 152 is arranged to be driven by the engine. The conduit 150 is connected to a fuel inlet 153 the passage of fuel from which to a fuel outlet 154, connected to the injector devices 903 (via fuel line F1 and manifold F2 in FIG. 1), is controlled by a valve 155 forming part of the metering valve assembly.

Conveniently, the valve 155 may comprise a ported sleeve having inlet and outlet ports which register respectively with the inlet and outlet conduits 153 and 154, the sleeve having a valve stem rotatable within its bore. The valve stem conveniently has a flat extending along part of its length and which, by rotation of the valve stem, can vary the area of the inlet port in communication with the outlet port of the valve sleeve. The valve stem is connected to a cam-follower 156 which co-operates with a cam 157 having two cam surfaces, relative movement between either cam surface and the cam-follower causing rotation of the valve stem. The metering valve assembly also includes a chamber 158 divided into two compartments 159 and 160 by a flexible diaphragm 161. The chamber 159 is connected to the conduit 150 on the control valve side of the centrifugal relief valve 151. The chamber 160 is connected to the fuel return conduit (F5, FIG. 1) from the relief valve 151 and contains a coil spring 162 which bears against one side of the diaphragm 161 and a shaft 163 secured to that side of the diaphragm is secured to the cam-follower 156.

Return fuel flow to the tank (905, FIG. 1) is controlled by an air pressure balance valve (908, FIG. 1) which ensures that the flow conditions of fuel to the injector devices and return fuel to the tank are balanced and adjusts the return fuel flow conditions in correspondence with changes in pressure of air supplied to the injector devices. In FIG. 5 the air pressure balance valve comprises a chamber 165 having two compartments 164 and 166 separated by a resilient diaphragm 167. Fuel from the relief valve return line is fed to the compartment 164 from whence it flows under control of a needle valve 170 to a conduit 169 (F5, FIG. 1) connected to the fuel tank (905, FIG. 1). The needle valve 170 is carried by the diaphragm 167 the position of which is varied in dependence upon injector air pressure connected to the compartment 166 via a pipe 171 (A5, FIG. 1) from the air blower (904, FIG. 1). Thus the fuel flow from the relief valve is via a restriction controlled in dependence upon injector air pressure.

The cam 157 is rotatable by a lever 168 connected to the engine throttle control and such rotation also rotates the fuel metering valve 155.

The amount of fuel supplied to the injector devices 903 by the metering valve assembly described above will depend upon the positions of the two cam surfaces of the cam 157 with respect to the cam-follower 156. Movement of the throttle control will rotate the cam 157 moving one of its cam surfaces with respect to the cam-follower 156 and hence rotate the valve stem which controls the fuel flow from inlet 153 to outlet 154. The diaphragm 167 will always move valve 170 so as to control the fuel pressure in chamber 164 to be equal to the air pressure in chamber 166, e.g. if the fuel pressure in chamber 164 falls below the air pressure in chamber 166 the diaphragm will move to the left causing the valve 170 to restrict the flow of fuel back to the fuel tank. It follows that the pressure in chamber 160, which is the same as the pressure in chamber 164, will always equal the air pressure. The pressure in chamber 159 which is the same as the pressure in conduit 150, is equal to the pressure determined by the centrifugal relief valve 151 added to the pressure in chamber 164, i.e. added to the air pressure. The net pressure on diaphragm 161 is thus equal only to that created by the centrifugal relief valve and is therefore proportional to the square of engine speed. Changes in fuel pressure in chamber 159 determined only by the relief valve 151—hence by the engine speed—will act upon the diaphragm 161 in opposition to the spring 162 to move the shaft 163 causing relative movement between the second cam surface of cam 157 and the cam-follower 156 and adjust the fuel flow from the inlet 153 to the outlet 154. The pressure in the fuel conduit 154 leading to the injector devices will thus be proportional to the engine speed and the air pressure.

The control means described with reference to FIG. 5 serves to control the volume of fuel supplied to the injector devices 903 in accordance with engine air intake flow by the throttle opening (lever 168), and engine speed (relief valve 151 and diaphragm 161).

The detailed construction of a particular form of metering valve 901 is shown in FIGS. 6, 7 and 8 and is also disclosed by my co-pending application Serial No. 330,965, filed December 16, 1963. The valve has a casing 250 formed with a fuel inlet 251 and fuel outlet 252, an air inlet 252 and air escape aperture 254. The inlet 251 is able to communicate with the outlet 252 under control of a metering valve having a valve stem 255 rotatable in a sleeve 256 which is located in a passage connecting the inlet 251 and outlet 252. The sleeve 256 has an external peripheral recess 257 which registers with the inlet 251, and is connected to the bore of the sleeve by a passage 258. A further external peripheral recess 259 in the sleeve 256 registers with the outlet 252 and is connected to the bore of the sleeve by a passage 260. The valve stem 255 is a close fit in the bore of the sleeve 256 and has a flat 261 formed over part of its length and which can register with both passages 258 and 260. The flat 261 is so dimensioned that rotation of the stem 255 accurately determines the area of passage 258, and hence the amount of petrol flowing there-through, in communication with the passage 260 and the outlet 252.

The casing 250 has a centrally apertured internal web 262 and a boss 263 seats in the aperture. Mounted for rotation around and axial movement along the boss is a cam member 264 having a gear formed at its upper end. A lever 265, constituting a cam-follower, secured to the valve stem 255, is urged against the cam member 264 by a coil spring 266. The cam member 264 is pear-shaped in cross-section as seen in FIG. 7 and thus rotation of the cam member will cause the lever 265 to rotate the valve stem 255.

A pinion 267 meshes with the gear of the cam 264 and can co-operate with the gear over the whole length of linear travel of the cam 264. The pinion 267 is supported by a shaft 268 rotatable, in use of the metering valve, by operation of the throttle linkage of the engine which varies the air intake flow to the engine. Thus movement of the throttle control will cause rotation of the cam 264 and hence of the valve stem 255 and control the volume of petrol passing from the fuel inlet 251 to the fuel outlet 252.

The cam 264 is contoured around its periphery, as shown in FIG. 7, and also is contoured in an axial direction. In FIG. 6, the full line section of the cam 264 shows it in one extreme position with respect to its rotary and axial movements whilst the broken-line outline shows the cam in its other extreme position of both rotary and axial movements and indicates the axial profiling of the cam. The cam 264 thus has a pear-shaped cross-section increasing in area from the top to the bottom of the cam as seen in FIG. 6. It will be appreciated that the actual profiles adopted for the peripheral and axially extending cam surfaces will depend upon the requirements of a particular design.

The general considerations which determine the shaping of the cam are concerned with the amount of air inspired by an engine operating under varying conditions of throttle opening and speed, e.g. with the throttle fully opened the engine will inspire air at a rate approximately proportional to the engine's speed of rotation over most of its speed range but at the upper end of the speed range the rate of inspiration of air will become less than the proportional rate and the fuel requirements will also be less. The shape of the cam over which the cam-follower operates when the cam has been turned to the full throttle position will therefore be parallel to its axis over most of its length, but the part of the profile which becomes operative when the cam has risen towards its uppermost position due to rise in engine speed will have a rising shape so as to increase the restriction offered by the metering valve. If the engine is operating at a constant speed so that the cam does not move axially and the throttle is opened further, the engine will inspire more air and will therefore require more fuel. For this reason the cam has a shape in a radial sense which will tend to open the metering valve as the throttle is opened. The shape of the cam in the radial sense may be different at every plane along its length and the shape of the cam in an axial sense may be different at each radial position; it is thus possible for the cam so to operate the metering valve that the injectors are supplied with the correct amount of fuel for any combination of engine speed and throttle position.

The cam 264 is carried by a shaft 270 secured at its lower end to the bottom of the cam and at its upper end to a diaphragm 271 clamped around its periphery between upper and lower portions of the casing 250 above the air inlet 253 and the web 262, defining a chamber 272. This chamber 272 can communicate, via drillings in the walls of the upper portion of the casing 250, with a chamber 273 in the interior of the upper portion of the casing 250 above the diaphragm 271, and hence with the escape aperture 254, under control of a ball-valve 274 which can co-operate with an orifice 275, to determine the leakage rate from the chamber 272 via the aperture 254.

The ball-valve 274 is carried by a pin 276 which extends through the orifice 275 into the chamber 273 and is spigoted at its lower extremity in a platform 278. Pivoted between the respective ends of the platform 278 and the respective upper ends of links 279 are coil springs 280, the lower ends of the links 279 being pivoted to a platform 281 secured to the upper surface of the diaphragm 271. The links 279 are urged outwardly by rods 282 arranged radially in the platform 281. A ball 283 engages the inner faces of rods 282 and a screw 284 has a conical end which engages the ball 283; movement of the screw 284 inwards causes axial movement of the ball 283 which in turn drives the rods 282 outwards to alter the tension on the spring 280.

The ball-valve 274 also bears upon one end of a shaft 285 slidably extending through a closely fitting sleeve 286 in the top, as seen in FIG. 6, of the casing 250, and the other end of the shaft 285 carries a cap 287 which bears upon a diaphragm 288 secured by a block 289 to the casing in sealed relationship therewith. A spring 290 bears through a cap 291 on the diphragm 288 and the spring loading is adjustable by a screw 292. A chamber 293 formed below the diaphragm 288 communicates with an atomsing air pressure inlet port 294 whilst the port 251 communicates with a chamber 295 formed above the diaphragm 288. The port 201 in conjunction with a port 296, also communicating with the chamber 295, enables the metering valve to be connected in a fuel supply line without use of a T-junction.

Thus, flexure of the diphragms 271 and 288 causes linear movement of the shaft 270 and hence of the cam 264, and rotation of the lever 265 and the valve stem 255.

In use of the metering valve shown in FIGS. 6, 7 and 8, in a system as shown in FIG. 1, the air inlet 294 is connected to the air conduit A4 (FIG. 1), the petrol inlet 251 to the fuel conduit F3 and the petrol outlet 252 to the fuel conduits F1 and F4 and hence to the manifold F2 and the fuel chambers of the injector devices 903 via the restrictors 902. The air inlet 253 is connected to the air conduit A4 but could be connected to any other convenient fluid source.

As mentioned previously in describing FIGS. 6, 7 and 8, the shaft 268 is connected to the throttle linkage of the engine and thus movement of the throttle linkage causes rotation of the cam 264, through shaft 269 and pinion 267, which roation is transmitted by the lever 265 to rotate the valve stem 255 and vary the area of the inlet passage 258 in communication with the outlet 252. It is arranged that roation of the shaft 268 in a sense corresponding to opening of the throttle (increasing air intake flow to the engine) increases the area of passage 258 uncovered by the flat 261 on the valve stem 255 whilst rotation of the shaft 268 in an opposite sense, corresponding to closing of the throttle (i.e. decreasing engine air intake flow), decreases that area.

Air supplied to the inlet 253 will pass through the chamber 252 and the drillings in the casing through the orifice 275 under control of the ball-valve 274 and escape from chamber 273 through the aperture 254, the ball-valve 224 taking up a position in which the leakage is such that the force on the diaphragm 271 due to the pressure in chamber 272 is balanced by the combined action of the tension springs 280, the compression spring 290, the pressure acting on the upper surface of diaphragm 288 and the pressure acting on the lower surface of diaphragm 288. Should the pressure of the fuel supply to the inlet 251, which is controlled in dependence on engine speed, subsequently increase, this pressure acting on the upper surface of diaphragm 288 will flex the diaphragm tending to close the ball-valve 274 and so raise the air pressure in the chamber 272. The diaphragm 271 will now flex upwards under this increased pressure until the springs 280 have been extended sufficiently to overcome the increase in pressure on diaphragm 288. The net result is that a new equilibrium position of the platform 281 is established and the shaft 270 has been raised from its previously held position. The upward movement of the shaft 270 causes corresponding upward movement of the cam 264, and rotation of lever 265 and valve stem 255 in a direction to increase the area of the fuel inlet passage 258 uncovered by the flat 261 on the valve stem 255. If the fuel pressure on the upper surface of diaphragm 288 decreases then the converse of the above described movement occurs with the shaft 270 taking up an equilibrium position lower than its previous position causing downwards movement of the cam 264 and rotation of the valve stem 255 to decrease the area of inlet passage 258 which is uncovered by the flat 261. The interconnection between the diaphragms 288 and 271 constitutes a fluid operable servomechanism serving to translate flexual movements of the diaphragm 288 into corresponding magnified linear movements of the shaft 270 and cam 264.

Thus, the metering valve shown in FIGS. 6–8 will control the fuel supply to the injector devices 903 in dependence upon the fuel pressure as well as in dependence upon the throttle opening of the engine (i.e. engine air intake flow). It will be understood that the air pressure on the underside of diaphragm 288 acts in opposition to the fuel presure on the upper face of the diaphragm and thus the net pressure on the diaphragm 288 is the difference between the fuel pressure and the air pressure. Convenient values of fuel and atomising air pressure from the pump and blower 904 for this arrangement are 20 p.s.i. and 2 p.s.i., respectively, the fuel and air pressures in the injector nozzles both being of the order of a few p.s.i.

Figure 9:
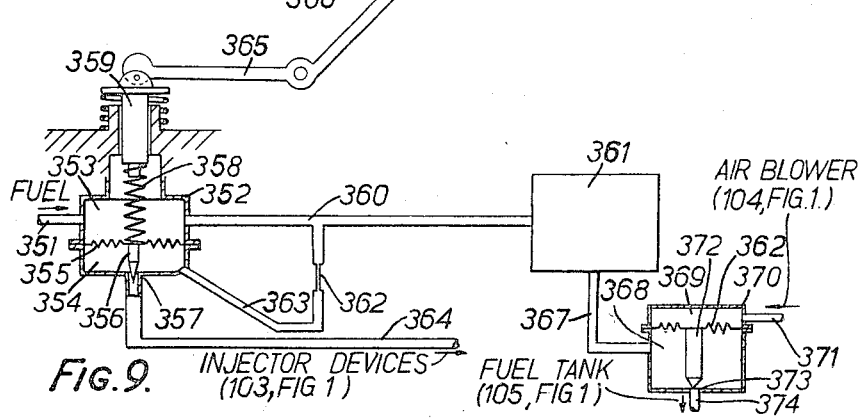

FIG. 9 shows another metering valve and control arrangement suitable for use in a fuel injection systems as illustrated in FIG. 1. In the arrangement (shown in FIG. 9) fuel from the fuel pump flows through a conduit 351 (F3, FIG. 1) to a chamber 352 divided into two compartments 353 and 354 by a flexible diaphragm 355. In the compartment 354 a metering valve member 356 that co-acts with an orifice 357 is urged upwards by a tension spring 358, which is attached at its upper end to a plunger 359. Fuel flowing through the compartment 353 passes into a conduit 360 which leads to a centrifugal relief valve 361 (similar to the valve 151 shown in FIG. 5) and also to a restriction 362, which in turn leads through a conduit 363 to the compartment 354, and thence through the orifice 357 and a conduit 364 (F1, FIG. 1) to the injector devices. A bell-crank lever 365 is coupled at one end of the plunger 359 and at the other end bears upon a 3-dimensional cam surface 366 of a cam which is movable in two senses, in response to engine speed (the cam being caused to move in response to fuel pressure changes as determined by the centrifugal relief valve 361), and in response to throttle opening, respectively. The diaphragm 355 will always take up a position of equilibrium determined by the pressure in compartment 353 which is opposed by the pressure in compartment 354 to which is added the load exerted by spring 358. It follows that the difference between the pressures in compartments 353 and 354 is determined by the load exerted by the spring 358 and this in turn is determined by the position of the cam 366. The pressure drop across the restriction 362 is equal to the difference between the pressures in compartments 353 and 354 and it follows that the flow through the restriction 362, and therefore the flow to the injector devices through conduit 364, is determined by the forces exerted by spring 358 which again is determined by the position of the cam 366. The fuel flow to the injector devices is therefore controlled by the engine speed and the engine air intake flow (throttle opening). The fuel return from the centrifugal relief valve 361 to the fuel tank is controlled by an air pressure balance valve comprising a chamber 369 having lower and upper compartments 368 and 370 divided by a resilient diaphragm 371. The fuel return conduit from the relief valve 361 is connected by a conduit 367 to the compartment 368 that has an outlet orifice 373 from which fuel can flow to a conduit 372 (F5, FIG. 1) under control of a valve member 372. The valve member is carried by the diaphragm 371 and atomising air pressure from the air blower is led through a conduit 375 (A5, FIG. 1) into the compartment 370 so that the pressure in the compartment 368 is equal to that of the atomising air. Since the conduit 364 (F1, FIG. 1) discharges into the injector devices where the atomising air pressure is present, and the return from the relief valve 361 is lead to compartment 368 which is also at the pressure of the atomising air, it follows that variations in the atomising air pressure have no effect on the metering of the system.

Figure 10:
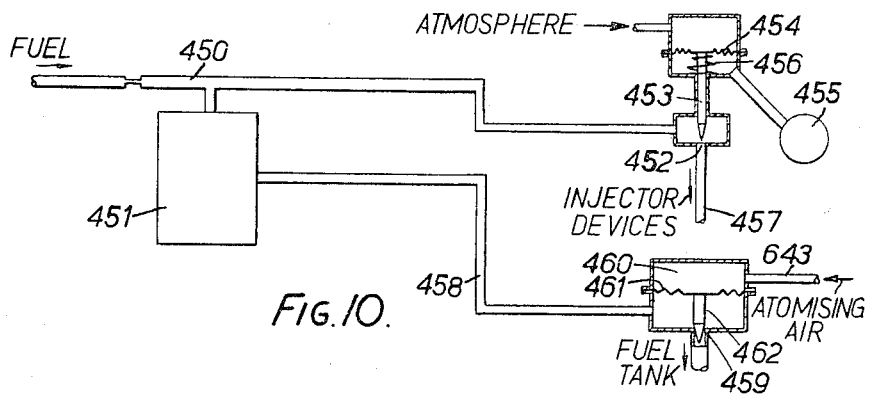

FIG. 10 shows a further alternative metering valve and control means, suitable for use in a fuel injection system as illustrated in FIG. 1, and which serves to control fuel supply to the injector devices in accordance with throttle opening and engine speed.

In the arrangement shown in FIG. 10, a conduit 450 (F3, FIG. 1) from the fuel pump has connected to it an engine driven centrifugal relief valve 451 of similar construction to that shown in FIG. 5. The conduit 450 also is connected to a fuel metering orifice 452 through which fuel flow is controlled by a needle valve 453 carried by a diaphragm 454. The underside of the diaphragm 454 is connected to the engine inlet manifold 455, and hence is exposed to the engine induction pressure, which is opposed by a spring 456 acting on the diaphragm 454; the upper side of the diaphragm 454 is vented to atmosphere. The fuel flow through the orifice 452 thus is varied with changes in induction pressure and therefore in engine intake air flow. The orifice 452 is connected to a conduit 457 (F1, FIG. 1) which leads to the fuel chambers of the injector devices.

The fuel return conduit 458 (F5, FIG. 1) from the relief valve 451 is connected to the fuel tank via an orifice 459 in the lower compartment of a chamber 460 forming part of an air pressure balance valve. The lower compartment is divided from an upper compartment of the chamber 460 by a resilient diaphragm 461 carrying a needle valve 462 which co-acts with the orifice 459. The upper compartment of the chamber 460 is connected to the atomising air pressure by a conduit 463 (A5, FIG. 1).

In operation of this arrangement, for any value of the manifold vacuum the diaphragm 454 will take up a position of equilibrium where the force downwards on the diaphragm, due to the manifold vacuum, is opposed by the force upwards exerted by spring 456. Since the needle 453 is coupled to the diaphragm 454 the effective area of the orifice 452 will depend upon the value of the manifold vacuum. The pressure of fuel in the conduit 450 is the sum of the pressure created by the centrifugal relief valve 451 and the atomising air pressure which is applied to the upper side of diaphragm 451 through the conduit 463.

The flow through the orifice 452 is therefore dependent upon engine speed (centrifugal relief valve), and inlet manifold depression (diaphragm 454) representing engine air intake flow, because the conduit 457 leads to the injector devices in which the atomising air pressure exists. The pressure of the fuel supply to the injectors will depend on induction pressure of the engine—corresponding to engine air intake flow—(diaphragm 454), and on engine speed (relief valve 451). Since the air pressure in the injector devices is applied through conduit 463 to act on the diaphragm 461, so raising the fuel pressure, the volume of fuel delfivered to the injector is independent of the air pressure.

Figure 11:
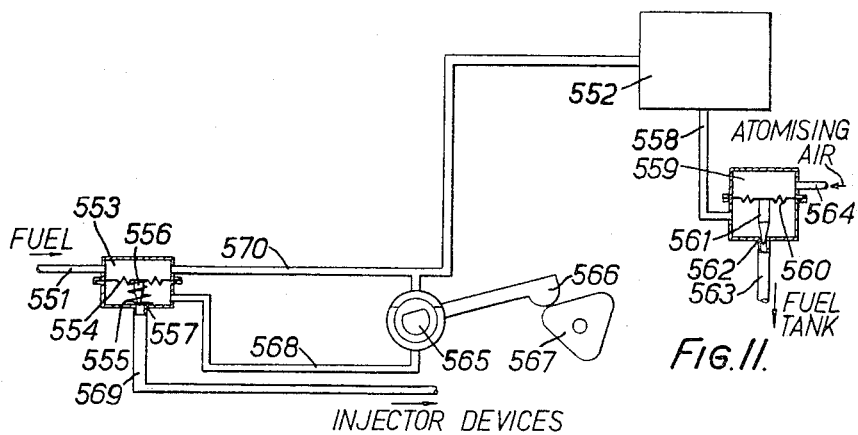

FIG. 11 shows yet another metering valve and control means suitable for use in a fuel injection system as illustrated by FIG. 1, and controls fuel flow to the injector devices in accordance with throttle opening and engine speed. In this arrangement, fuel is supplied from a fuel pump to a conduit 551 to which is connected, via the upper compartment of a fuel metering chamber 553 and a conduit 570, an engine-driven centrifugal relief valve 552 (similar to the valve 151 in FIG. 5). The chamber 553 is divided by a resilient diaphragm 554 which is urged upwards by a spring 555 and carries a valve member 556 that co-acts with a metering orifice 557 in the lower compartment of the chamber 553. The fuel return from the relief valve 552 to the fuel tank is controlled by an air pressure balance valve, the return fuel flow being led through a conduit 558 to the lower compartment of a chamber 559 divided by a resilient diaphragm 560 that carries a valve member 561 co-acting with an orifice 562 leading to a return conduit 563 to the fuel tank. The upper compartment of the air pressure balance valve chamber 559 is connected by a conduit 564 to the injector atomising air pressure. The conduit 570 also leads to a rotary control valve 565 which is operable by a lever 566 which bears upon a cam 567. Fuel passing through the rotary control valve 565 is led through a conduit 568 to the lower compartment of the chamber 553 and thence through the orifice 557 to a conduit 569 connected to the injector devices.

In operation, the action of the valve 556 is such as to maintain a constant pressure drop, determined by the spring 555, across the valve 565 and the fuel feed to the injectors is therefore dependent upon the opening of the valve 565. The cam 567 has a 3-dimensional cam surface and is movable in two senses in response to engine speed, through the pressure existing in conduit 570 (e.g. by a servomechanism such as shown in FIGS. 6–8), and by throttle opening (e.g. by the means shown in FIGS. 6–8), respectively. The action of the valve 561 is to add to the pressure created by the centrifugal valve 552 the pressure of the atomising air so that when a control unit as shown in FIGS. 6–8 is used to operate the cam 567, the net pressure on the diaphragm 288 (FIG. 6) is equal to that created by the centrifugal relief valve 552 alone.

Figure 12:
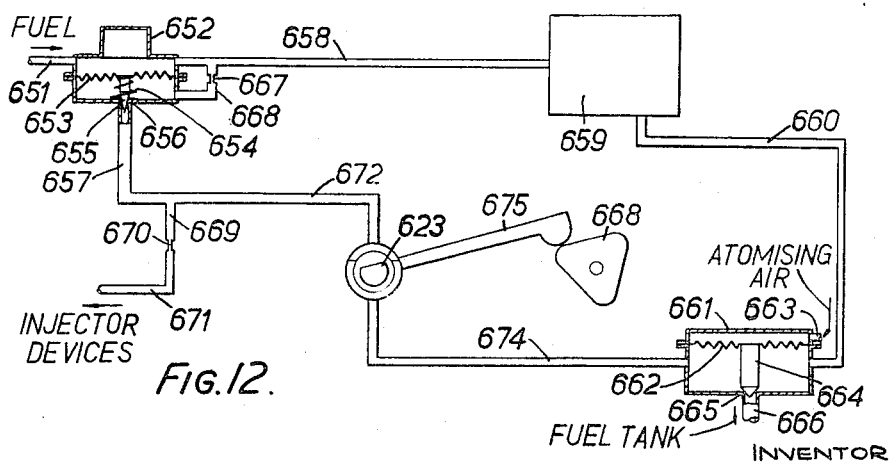

Another metering valve and control means suitable for use in the system illustrated in FIG. 1 is shown in FIG. 12. In this arrangement fuel flows from a fuel pump through conduit 651 to the upper compartment of a metering valve chamber 652. A resilient diaphragm 653 divides the chamber 652 and the diaphragm is urged upwards by a spring 654. The diaphragm carries a valve member 655 which co-acts with an orifice 656 leading to a conduit 657. Fuel flows through the upper compartment of the chamber 652 and a conduit 658 to a centrifugal relief valve 659 (similar to valve 157 in FIG. 5), the return from which flows through a conduit 660 to the lower compartment of a chamber 661 forming part of an air pressure balance valve. A resilient diaphragm 662 divides the chamber 661 and atomising air pressure is led through a conduit 663 into the upper compartment. The diaphragm 662 carries a valve member 664 which co-acts with an orifice 665 and fuel flowing through the orifice is led by a conduit 666 back to the fuel tank. Fuel also flows from the conduit 658 through a restriction 667 and conduit 668 to the lower compartment of chamber 652. Since the diaphragm 653 will always take up a position of equilibrium it follows that the difference between the pressures in the upper and lower compartments of the chamber 652 is determined by the strength of the spring 654, and from this it follows that the pressure drop across the restriction 667 has a constant value determined by the spring 654 and therefore that the flow through the restriction 667 and thence through conduit 668, orifice 656, and conduit 657 is constant. The constant flow through conduit 657 is divided into two parts, one part flows through a conduit 669, a restriction 670 and a conduit 671 to the injector devices, while the second part flows through a conduit 672, a rotary control valve 673 and a conduit 674 to the lower compartment of the chamber 661. The rotary valve 673 is actuated through a lever 675 by a cam 676 having a 3-dimensional cam surface and movable in two planes in response to engine speed (this movement being caused by changes in fuel pressure as determined by the centrifugal relief valve 659, and to throttle opening respectively. This movement of the cam may be effected by a control arrangement as shown in FIGS. 6–8, it being appreciated that the metering valve will rotate in an opposite sense to that described, i.e. throttle opening and increasing engine speed will tend to close the metering valve. The action of the rotary valve 673 is to apportion the constant flow through conduit 657 between a flow to the injectors and a flow back to the tank. Since the return from the relief valve 659 and the flow through the rotary valve 673 both lead to the lower compartment of the chamber 661, which is maintained at the atomising air pressure through the action of the diaphragm 662, and since the flow through the conduit 671 leads to the injectors in which the atomising air pressure is present, it follows that the value of the atomising air pressure has no effect on the fuel metering of the system.

The embodiments of the invention to be described with reference to FIGS. 13–33 of the drawings each includes a fuel supply ring main incorporating an engine driven pump in the supply branch of the ring main and a scavenge pump in the return branch. In operation of the engine, the engine driven pump varies the fuel pressure in the supply branch in dependence on engine speed, typically the pressure rising to 90 p.s.i. at a pump speed of 6000 r.p.m., there being a standing pressure of a few p.s.i., typically 2–3 p.s.i. Continuous circulation of the fuel through the ring main, with the highest rate of circulation at high engine speed and low engine loading, ensures that the system is self-cooling. From the supply branch, connections are led via flow equalising restrictors to low pressure air atomising injector devices, i.e. open injector devices, to which atomising air is supplied at a low pressure, typically 3 p.s.i., to entrain and atomise the fuel. The injector devices are located in the individual branch pipes from the engine inlet manifold to the cylinders and fuel is injected continuously, at substantaly the atomising air pressure. Fuel pump design is simplified by this use of continuous low pressure injection and this form of injection also results in commencement of fuel vaporisation prior to opening of the inlet ports, the rate of vaporisation being determined by control of the atomised fuel droplets.

Delivering of fuel to the injector devices is regulated partly by a metering valve device in the ring main. The metering valve can be disposed upstream or downstream of the injector devices and is controlled in response to engine air intake flow, for example engine throttle opening or engine inlet manifold vacuum. For an engine having a volumetric efficiency that varies little with engine speed, then control in response solely to engine inlet manifold vacuum would be sufficient.

The return branch of the ring main includes a collection tank from which fuel is pumped by the scavenge pump referred to above. The collection tank is situated at a level between the outlets of the injector devices and the fuel ring main branches so that any fuel driven out of the branch by expansion or vaporisation is fed to the collection tank and not to the injector devices. The collection tank is also vented to prevent fuel siphoning out of the system when the engine is not operating.

Since air pressure is used to atomise the fuel in the injector devices, and it is possible that at low engine speeds fuel supply pressure could be less than that of the atomising air, the fuel flow at all ports in the ring main is opposed by atomising air pressure. To this end, the fuel flow to the collection tank is via a valve responsive to atomising air pressure. This arrangement ensures that fuel pressure in the injector devices always exceeds that of the atomising air. In addition, the atomising air supply line to the injector devices incorporates a vacuum relief valve to ensure that depressed pressure conditions in the engine inlet manifold, to which the open injector devices are exposed, does not affect fuel flow through the injector devices.

The fuel injection systems to be described can also incorporate other devices for regulating fuel supply to the injector devices. For example, the system can incorporate an engine acceleration response device operable in response to sudden increases in engine inlet manifold pressure, as when the throttle control valve is opened rapidly, to supplement temporarily fuel flow to the injector devices. Such an arrangement ensures prompt engine response to rapid throttle opening. The fuel ring main can also include a valve device operable to supplement fuel supply under conditions of starting the engine from cold, such valve being manually or automatically operated, and/or a valve device for controlling fuel supply to the injector devices in dependence on atmospheric pressure. This latter valve can be either preset if in use the engine is not expected to encounter other than minor variations in atmospheric pressure or can be controlled by a pressure responsive device, i.e. a resilient capsule.

The general features of the fuel injection system referred to above are common to all the embodiments to be described and the following description implies incorporation of these features in each embodiment. The detailed description will also make it apparent as to which of the optional features referred to above are included in any particular embodiment.

In the fuel injection system illustrated in FIG. 13 there is shown a fuel priming pump 1 arranged to pump petrol from a fuel tank 2 to an engine driven impeller 3 serving to vary the fuel pressure at the impeller output in dependence on engine speed. The outlet side of the fuel pump 1 also is connected by a relief valve 4 back to the tank 2, the relief valve setting a low standing fuel pressure at the input to the impeller 3. The fuel delivered by the impeller 3 is supplied to an engine starting and over-run fuel supply control valve 5, shown in more detail in FIG. 21, that serves to allow adequate fuel flow under engine starting conditions when the pressure of fuel from the impeller is low and to cut-off fuel supply when the engine is running fast with the throttle closed, the valve 5 remaining open in intermediate conditions and passing fuel via a flow restrictor 6, which removes the standing pressure due to the relief valve 4 to a gas and air separator 7 and thence to a fuel manifold 8. The fuel supply to the manifold 8 is thus, under normal engine conditions, dependent on the fuel pressure, as determined by the impeller 3 and therefore dependent on engine speed.

Open fuel injector devices 9, i.e. low pressure air atomising injector devices, shown in greater detail in FIG. 20, are connected via conduits 10 and flow equalising restrictors 11 to the manifold 8 and are disposed one in each cylinder inlet branch from the engine inlet manifold 12, as better shown in FIGS. 14 and 15. FIGS. 13 and 14 show an arrangement for a 4-cylinder engine. The downstream end of the manifold 8 is connected to a fuel metering valve 13 shown in greater detail in FIGS. 17–19, operable in dependence on the engine air intake flow to control the amount of fuel passing from the manifold to a fuel return line to the fuel tank 2, and hence to control the amount of fuel supplied to the injector devices 9. The fuel supply arrangement thus comprises a fuel ring main having supply and return branches and through which, in operation of the engine, fuel is continuously circulated.

An air compressor 14A supplies atomising air at a low pressure, typically a few p.s.i., to the injector devices 9, the air supply conduit to the injector devices 9 including a vacuum relief valve 15 serving to ensure an air supply to the injector devices at atmospheric pressure should the pressure in the output line from the compressor 14A fall below atmospheric pressure due to the open injector devices being subjected to sub-atmospheric pressures existing in the inlet manifold.

The fuel return line from the fuel metering valve 13 is connected via an air pressure balance valve 16 to a collection tank 17 from which a pump 18 returns fuel to the tank 2. A vacuum relief valve 19 is connected to the collection tank 17 to prevent operation of the pump interfering with the fuel supply to the injector devices 9.

A barometric compensation valve 20 is connected between the gas and air separator 7 and the input side of the collection tank 17 and serves to adjust the fuel supply to the injector devices to compensate for changes in atmospheric pressure.

As mentioned above, the impeller 3 regulates the pressure of the fuel supplied to the fuel manifold 8 in dependence on engine speed so that, assuming that valve 5 is open, the amount of fuel supplied by the impeller increases with increasing engine speed. The amount of fuel supplied by the impeller to the manifold 8 will be adjusted by the barometric by-pass valve 20 in dependence on the temperature and pressure of the air intake to the inlet manifold 12. The valve 20 has a resilient bellows 21 containing fluid at sub-atmospheric pressure and the bellows is exposed to the air intake to the inlet maifold 12 by an aperture 22 in a chamber surrounding the bellows 21. From the bellows 21 depends a valve member 23 co-operable with an orifice 24 to control the flow of fuel from the gas and air separator 7 to the collection tank 17. It will be appreciated that for, say, increase in temperature of the inlet maifold air intake, the bellows 21 will expand allowing a greater quantity of fuel to be by-passed to the collection tank 17 whilst decreasing temperature decreases the quantity of fuel by-passed.

The quantity of fuel supplied from the fuel manifold 8 to the injector devices 9 is regulated by the metering valve 13 which controls the return of fuel from the manifold 8 to the tank 2 in dependence on the engine inlet manifold vacuum, which varies with engine air intake flow, as will be described in greater detail.

The engine has a throttle valve, best shown in FIG. 16, comprising a butterfly valve 14 (FIGS. 13 and 14) pivotally mounted within the air intake conduit 25 of the inlet manifold 12 so that the valve 14 extends transversely across the bore of the conduit 25, when in a closed position, and can be pivoted by the usual throttle controls (not illustrated) to align with the axis of the conduit 25 and when in a fully open condition. The conduit 25 has two ports 26 and 27, the former being located on the engine side of the valve 14 immediately adjacent the part of the valve located nearest the engine. The port 27 is disposed diametrically opposite the port 26. Thus, when the engine is running the port 26 is exposed to the inlet manifold vacuum only when the valve 14 is closed, as shown in full lines in FIG. 16; as soon as the valve 14 is opened towards the fully open position (shown in broken lines in FIG. 16) the port 26 is exposed to atmospheric pressure. The port 27 is so located that it is exposed to the inlet manifold pressure under all positions of the valve 14.

The metering control valve 13 is shown in FIGS. 17–19 and is disclosed in my co-pending application serial No. 434,418 filed February 23, 1965. The valve has a casing 30 within which are defined three chambers 31, 32 and 33. The central chamber 32 is generally rectangular in section having one side closed by a cover plate 34 (FIG. 18) and in a thickened portion of the opposite wall there is a cylindrical aperture 35 accommodating a metering valve 36. The metering valve comprises a tubular member 37 having, intermediate its ends, a transverse V-shaped slot 38 extending approximately diametrically across the member 37. The tubular member 37 is disposed within a sleeve 39, being located by a spring clip 40 engaging the periphery of the tubular member 37 and an end face of the sleeve 39 so that the transverse slot 38 is axially aligned with a rectangular aperture 41 in the wall of the sleeve 39. The valve member 37 closely fits the sleeve 39 but can be rotated therein to bring the V-slot 38 and the aperture 41 into registration to define a metering orifice and also to vary the degree of registration and hence the area of the metering orifice. The width of the aperture 41 corresponds to the greatest width of the V-slot 38 and the peripheral length of the aperture corresponds to about half the peripheral length of the V-slot.

The tubular member 37 has a closed end 42 and the sleeve 39 is disposed in the aperture 35 so that the closed end 42 of the tubular member 37 projects beyond the sleeve into the chamber 32. Extending around the periphery of the sleeve 39, in communication with the aperture 41, is a recess 43 that registers with a passage 44 in the thickened wall portion of the chamber 32 leading to a port 45 connected to the downstream end of the fuel manifold 8 (FIG. 13). O-ring seals 46 on either side of the recess 43 prevent leakage between the sleeve 39 and the bore of the aperture 35.

The open end of the tubular member 37 leads to a port 47 connected to the air pressure balance valve 16 (FIG. 13). Thus, the area of the metering orifice defined by the V-slot 38 and the aperture 41, controls the amount of fuel by-passed from the injector devices 9 and by arranging that the metering orifice area decreases with increasing engine air intake flow through the conduit 25, in a desired manner, the fuel supply from the manifold 8 to the injector devices 9 can be controlled in dependence on the air intake flow which will vary with, interalia, the throttle opening. Such control of the metering valve 36 is effected by a cam 48 pivoted on a pin 49 supported from the wall of the chamber 32 in which is defined the aperture 35. The face of the cam 48 co-operates with a cam follower 50 carried by an arm 51 clamped to the end 42 of the metering valve member 37 projecting into the chamber 32. The sleeve 39, at the end adjacent the open end of the valve member 37, is formed as a gear 52 engaging with a screw 53 captively mounted in a cover 54 which defines the port 47. Thus, pivotal movement of the cam 48 about the pin 49 causes rotation of the valve member 37 within the sleeve 39 and thus rotation is made to vary the area of the aperture 41 uncovered by the V-slot 38, as will be described later.

A link 55 is pivoted at one end to the cam 48, the other end extending through an aperture 56 in the wall of the chamber 32 opposite the metering valve 36, being pivoted at its other end to a yoke 57 secured in the head of a hollow piston 58 slidably mounted in a cup-shaped cap 59 defining the chamber 31. The piston 58 is fitted with a nylon piston ring, not shown. A screw 60 is threadedly mounted in the closed end of the cap 59 and extends into the chamber 31. Secured to the end of the screw 60 within the chamber 31 is a cup 61 that retains a coil spring 62 bearing against the head of the piston 58, to urge the latter towards the position shown in FIG. 18. The screw 60 provides means for adjusting the force exerted by the spring 62 on the piston 58 and has a locking nut 63 for securing the screw in a desired position. The cap 59 has a port 64 leading from the chamber 31 and connected to the port 27 in the inlet manifold air intake conduit 25. Since the port 27 is on the engine side of the valve 14 for all throttle positions, the piston 58 will be exposed to the inlet manifold vacuum pressure during operation of the engine.

It is arranged that with the engine running and the throttle valve 14 closed, the vacuum pressure in the chamber 31 is sufficient to retract the piston 58 within the chamber 31, pivoting the cam 48 about the pin 49 in an anticlockwise sense (FIG. 17) thereby moving the cam surface of the cam over the cam follower 50 and rotating the valve member 37 within the sleeve 39. In the closed position of the throttle valve 14, it is required to by-pass a maximum amount of fuel to the fuel return line and accordingly under these conditions the widest portion of the V-shaped slot 38 is arranged to coincide at, or slightly beyond, one end of the rectangular aperture 41 and one apex of the V-slot to coincide at, or slightly within, the opposite end of the aperture 41, i.e. a desired maximum area of the aperture 41 is uncovered by the V-slot 38. As the throttle valve 14 is opened it is desired to increase the fuel supply to the injector devices with decrease in inlet manifold vacuum i.e. increasing air intake flow and as the inlet manifold vacuum decreases, so does the vacuum in the chamber 31 of the metering control valve. With such decreasing vacuum, the piston 58 is moved by the spring 62 towards the position shown in FIG. 17 causing the cam 48 to pivot in a clockwise sense (FIG. 17) towards the position shown in that figure. This rotation of the cam 48 produces a rotation of the valve member 37 which causes a decrease in the area of the aperture 41 uncovered by the V-slot 38 and a corresponding decrease in the amount of fuel flowing from the manifold 8 to the fuel return line (i.e. an increase in the amount of fuel supplied to the injector devices 9).

If the throttle valve 14 is now moved again towards the closed position and the inlet manifold vacuum increases, i.e. air intake flow decreases the piston 58 again is retracted within the chamber 31 to pivot the cam 48 causing rotation of the valve member 37 to increase the area of the aperture 41 uncovered by the V-slot 38.

In this manner the metering control valve regulates the fuel supply to the injector devices by adjusting the amount of fuel by-passed from the manifold 8 to the fuel return line in dependence on engine inlet manifold pressure. When the engine is idling it has been found desirable to maintain a constant fuel supply to the injector devices, when the throttle valve 14 is closed. This is accomplished in the metering control valve 36 by the inclusion of a further cam 65 pivoted on the pin 49 and disposed by the side of the cam 48 for co-operation with the cam follower 50 to override the cam 48 under certain conditions, as will be explained. The cam 65 is coupled to a pressure sensitive resilient diaphragm 66 by a link 66A pivoted at one end to the cam 65 and at its other end to a yoke 67 carried by the diaphragm. The diaphragm extends across an aperture 68 in a wall of the chamber 32 opposite the cap 59 and is surrounded, externally of the chamber 32, by an enclosure 69, defining the chamber 33, and having a port 70 which is connected to the port 26 in the air intake conduit 25 of the inlet manifold 12 (FIGS. 13, 14 and 16).

When the throttle valve 14 is open, the port 26 is exposed to atmospheric pressure and since there is no pressure differential across the diaphragm 66 the cam 65 is located in the position shown in FIG. 17 and does not cooperate with the cam-follower 50. However, should the throttle valve 14 be closed, the port 26 is exposed to the inlet manifold vacuum which is sufficient to cause the diaphragm 66 to pivot the cam 65 into engagement with the cam follower 50 lifting it clear of the cam 48, which under these conditions is at the opposite end of its travel to that shown in FIG. 17. The cam 65 is so designed that it maintains a constant fuel supply to the injector devices under engine idling conditions when the throttle valve is closed, even though the inlet manifold vacuum may vary slightly.

As soon as the throttle valve 14 is even partly opened, the port 26 again is exposed to atmospheric pressure and the cam 65 returned to the position shown in FIG. 18, the piston 58 and cam 48 then again taking over control of the metering valve 36.

The fuel injector devices may be constructed as shown in FIG. 20. Each device 9 has a casing 71 within which is defined a fuel chamber 72 that intercommunicates with a mixing chamber 73 from which extends an elbow-shaped open injector nozzle 74. The devices 9 are located in the conduits leading from the inlet manifold 12 to the engine cylinders with the casing 71 of each device disposed uppermost and the orifice of the nozzle 74 directed towards the inlet valve of the cylinder. The conduits 10 are connected to the fuel chambers 72 of the respective injector devices and the air supply conduit from the compressor 14 is connected to each of the mixing chambers 73 of the injector devices.

In operation of the system, the chambers 72 are supplied with metered fuel from the manifold 8 at a pressure which typically can range from 1–90 p.s.i., dependent on engine speed and the compressor 14 supplies air to the mixing chambers 73 at a pressure typically of the order of 3 p.s.i. Fuel passes from the chambers 72 to the chambers 73 of the devices 9 and is entrained by the air passing from the chambers 73 to the nozzles 74, leaving the injector nozzles in the form of droplets at a pressure substantially equal to the atomising air pressure. However, a preferred form of the injector devices is shown in FIG. 25 and will be described later.

The construction of the injector devices has been found to produce efficient mixing of the fuel and air in the mixing chambers without utilisation of mechanical mixing devices and the construction of the injector devices is very simple and economical.

Under certain conditions, e.g. when the engine throttle valve is partly closed and there is a vacuum in the induction manifold, the air supply conduits from the compressor 14 could be subject to sub-atmospheric pressures which could lead to fuel passing from the chambers 72 of the injector devices to the air supply line as well as leading to the injection of petrol from the injector devices 9 instead of the desired air/petrol mixture. In order to prevent such an occurrence, the vacuum relief valve 15 is connected to the air supply conduit so that should conditions of sub-atmospheric pressure arrive in the air supply line, the vacuum relief valve 15 will operate to admit air at atmospheric pressure into the supply line and hence to the injector devices 9 and so prevent sub-atmospheric pressure conditions arising in the injector devices.

The system as thus far described will be seen to provide for the continuous injection of fuel/air mixture at pressures of a few p.s.i. from open injector devices into the inlet manifold branch conduits of the engine. The quantity of fuel supplied to the injector devices is regulated in accordance with engine speed by an engine driven impeller and in accordance with engine loading by a metering control valve in the fuel return line which is controlled—dependence on engine air intake flow by response to the engine inlet manifold vacuum.

As mentioned in the description of FIG. 13, the fuel return line from the metering control valve 13 is connected to a collection tank 17 via an air pressure balance valve 16. The valve 16 comprises a chamber 80 divided into upper and lower compartments by a resilient diaphragm 81 which co-operates with an outlet 82 in the lower compartment to control the fuel flow through the outlet 82 from the metering control valve 13, the outlet port 47 of which is connected to an inlet 83 to the lower compartment. The upper compartment is connected to the air supply conduit from the compressor 14 and the valve 16 thus serves to ensure that the return fuel flow to the tank 2 takes place against a similar pressure to that met by the fuel flowing from the manifold 8 to the injector devices 9, to which the output of the compressor 14 is also applied. Thus, the fuel flows in the injector device supply line and in the fuel return line are balanced under all operating conditions of the system, and that fuel delivery pressure cannot fall below the atomising air pressure, so ensuring accurate fuel metering.

The outlet 82 is connected to the collection tank 17 from which the fuel is returned to the tank 2 by the scavenge pump 18. The pump 18 ensures that for all open or partly opened positions of the metering control valve the fuel is corectly metered to the injector devices. In order to prevent the pump 18 operating to starve the injector devices 9 of fuel, the vacuum relief valve 19 is connected to the collection tank 17.

In the preceding description of the operation of the fuel injection system illustrated in FIG. 13, it has been assumed that the control valve 5 has been open. The purpose of the valve 5 is to allow fuel supply to the manifold 8 under normal engine running conditions, to ensure an adequate fuel supply to the injectors 9 when the engine is being started, and the impeller output pressure is low, and to cut off fuel supply from the impeller 3 when the engine is operating under overrun conditions, i.e. engine running fast with throttle closed.

The valve 5 is shown in greater detail in FIGS. 21 and 22 and is also disclosed in my co-pending application Serial No. 434,596 filed February 23, 1965. It comprises a chamber 91 having an enlarged diameter portion 92 shaped to define lower and upper annular seats 93 and 94 for a plate valve 95 having a diameter smaller than that of the portion 92. The plate valve 95 is biased towards a position in which it seats on the lower seating 93 by a coil spring 96 that supports a cup 97 enclosing a further spring 98, stronger than spring 96, bearing against the top of the chamber 91. A shoulder 99 limits the downwards movement of the cup 97 from which depends a rod 100 serving as a stop member to prevent movement of the plate valve 95 to seat on the upper seat 94 until the valve 95 is acted on by a force sufficient to overcome the spring 98. A fluid inlet conduit 101 leads to the chamber 91 on the underside of the seating 94 as well as on the upper side of the cup 97 and a fluid outlet conduit 102 leads from the chamber 91 above the seating 94. The valve 95 thus prevents fluid flow between the inlet 101 and the outlet 102 when it is seated on the lower seating 93 or the upper seating 94 but permits such fluid flow when it occupies an intermediate unseated position.

From the lower end of the chamber 91, a conduit 103 leads to a chamber 104 across which extends a resilient diaphragm disc 105, the upper side of which is secured to the plate valve 95 by a rod 106 so that flexing of the diaphragm can move the plate valve between the seats 93 and 94. From the lower side of the diaphragm 105 depends a spigot 107 having a conical lower end portion that extends into a tube 108 extending from a wall 109 that defines the lower part of the chamber 104 and forms part of a housing 110 having a cylindrical portion accommodating a piston 111. The piston 111 has a cylindrical recess 112 in its upper face, the mouth of which is flared, into which the tube 108 partly extends when the piston is in its lowermost position in the cylinder, defined by an annular stop 113, to which position it is biased by a spring 114. The wall of the tube 108 has apertures spaced around its peripheral surface, each aperture accommodating a ball 115. When the balls 115 are aligned with the flared mouth of the recess, they can be displaced radially outwards by downwards movement of the spigot 107 but when the balls 115 are aligned with the unflared region of the recess 112 the balls 115 are locked against the spigot 107, and cannot move outwardly, thus preventing downwards movement of the spigot 107.

A conduit 116 communicates with the chamber 114 above the diaphragm 105, a port 117 communicates with a chamber defined by the housing 110 between the cylindrical portion thereof and the wall 109, and a port 118 in the housing 110 communicates with the underside of the piston 111.

In use of the control valve 5 in the system shown in FIG. 13, inlet conduit 101 is connected to receive the fuel output from the impeller 3, the conduit 112 to the fuel supply line to the injectors, the conduit 116 to the inlet manifold port 27 (FIGS. 13, 14 and 16) for response of the diaphragm 105 to the inlet manifold vacuum, the port 117 to the fuel supply line on the inlet side of the impeller and the port 118 to the fuel supply line on the outlet side of the impeller.

The operation of the control device is as follows. When the engine is stationary, the positions of the components of the control device are as shown in FIG. 21. The piston 111 is seated on the stop 113 by the spring 114 and the balls 115 are aligned with the flared mouth of the recess 112, permitting the valve 95 to be seated on the lower seating 93 with the spigot 107 having been moved past the balls since they are free to slide radially outwardly and since there is no pressure difference across the diaphragm 105.

Upon turning of the engine by the starter motor with the throttle valve 14 (FIGS. 13 and 14) closed, or slightly open, a sufficient vacuum exists in the inlet manifold 12 (FIGS. 13 and 14) and acts on the upper side of the diaphragm 105 causing the latter to flex lifting the rod 106 and pushing the valve 95 off the seat 93 until it abuts the stop rod 100. Turning of the engine operates the impeller 3 (FIG. 13) which thus supplies fuel at low pressure through the inlet conduit 101 past the valve 95 and through the outlet conduit 102 to the fuel supply line for the injectors. The fuel pressure acting on the underside of the cup 97 is balanced by that fed to the upper side of the cup.

As the engine reaches idling speed with the throttle valve 14 (FIGS. 13 and 14) still closed, the pressure generated across the impeller 3 (FIG. 13) and applied between the ports 117 and 118 is arranged to be sufficient to cause the piston 111 to rise in the cylinder so that the wall of the recess 108 closes in the balls 115, preventing them from moving outwardly. The conical end of the spigot 107 is held between the balls 115 preventing downwards movement of the spigot 107 and the rod 106 and thus ensuring that the valve 95 cannot return to the seat 93 even though the engine throttle valve 14 (FIGS. 13 and 14) is opened, and the manifold vacuum destroyed, to increase the engine speed, and hence the continued flow of fuel from the valve 5 (FIG. 13) to the injectors is ensured. The relative positions of the control device components under these conditions is shown in FIG. 22.

Under engine overrun conditions, i.e. the engine running fast with the throttle valve closed, the engine does not require fuel. Under these conditions a high vacuum exists in the inlet manifold 12 (FIGS. 13 and 14), substantially higher than under engine idling conditions, and this high vacuum acting on the diaphragm 105 is arranged to be sufficient to cause the diaphragm to exert, via rods 106 and 100 and the spring cup 97, sufficient force to overcome the spring 98. The valve 95 then is moved upwards and seats on the upper seating 94, thereby preventing fuel flow from the inlet 101 to the outlet 102. It will be appreciated that due to the conical end of the spigot 107, the balls 115 do not prevent this upwards flexing of the diaphragm 105 under these conditions.

Upon opening the throttle, the vacuum in the inlet manifold 12 (FIGS. 13 and 14) decreases, or is destroyed, the diaphragm 105 flexes downwards and this movement, together with the force exerted by the spring 98, returns the valve 95 to the intermediate position previously referred to and fuel supply to the engine is recommenced, the downwards travel of the plate valve being determined when the spigot 107 is arrested by the ball 115.

Upon stopping of the engine, there is no pressure difference across the impeller 3 (FIG. 13) and the piston 111 descends to seat against the stop member 113. The engine manifold vacuum is destroyed and the spring 96 and diaphragm 105 exert a downwards force on the spigot 107 which can descend into the recess 108 since the balls 115 are again free to move radially outwards.

Instead of connecting the ports 117 and 118 across the fuel impeller 3, the port 118 may be connected so that it is responsive to engine lubricating oil pressure which is proportional to engine speed.

FIG. 23 shows an embodiment of the invention in which the fuel metering valve is located in the supply branch of the fuel supply ring main, i.e. between the impeller and the nozzle supply manifold.

In FIG. 23 there is shown a fuel priming pump 201 that supplies fuel from a tank 202 to an engine driven impeller 203, the fuel output pressure from the impeller being dependent on engine speed. The outlet of the pump 201 is also connected back to the tank 202 via a relief valve 204 so that the fuel supply to the impeller is at a low standing pressure.

The fuel output from the impeller is fed via a metering control valve 205 via an engine starting valve 206, that is open under all running conditions of the engine, but closed when the engine is stopped, a gas and air separator 207 and a check valve 208, which removes the standing pressure due to the relief valve 204, to an injector device fuel manifold 209 from which conduits 210, one for each engine cylinder, lead to open low pressure injector devices 211, constructed as previously described with reference to FIG. 8 and located in the inlet manifold of the engine as shown in and described with reference to FIGS. 13, 14 and 15.

The gas and air separator 207 is also connected via a cold start and atmospheric compensator valve 212, an acceleration valve 213 and an air pressure balance valve 214 to a fuel return line to the tank 202.

The system also includes an air compressor 215 the output of which is supplied to the injector devices 211 via a valve 216. The air supply conduit to the injector devices has connected to it a vacuum relief valve 211A serving to ensure an air supply to the injector devices 211 even though sub-atmospheric conditions may arise in the air supply conduit. The fuel supply to the injector devices thus takes place against the pressure of the air supplied to the devices and the air balance valve 214 is controlled by the pressure of the air supply from the compressor 215 to ensure that the injector device fuel flow and the tank return fuel flow takes place under balanced conditions to ensure correct metering of the fuel by the metering control valve 205. The construction and operation of the valve 214 is similar to that of the valve 16 shown in FIG. 13.

The metering control valve 215 meters fuel supply in dependence on the engine air intake flow and may be operated in dependence on the engine inlet manifold vacuum pressure, or may be operated by a linkage to the throttle valve control. If the former, the valve 215 may be constructed as shown in FIGS. 17–19, the valve member 37 then being controlled by the cam 48 so that the area of the aperture 41 of the sleeve 39 uncovered by the V-slot 38 increases with decreasing inlet manifold vacuum or increasing throttle opening.

The starting valve 206 comprises a plate valve member 217 seated by a spring 218 and the check valve 208 is of similar construction having a plate valve 219 seated by a spring 220. From the valve members 217 and 219 depend rods secured to a plate 221 resting on a resilient diaphragm 222 that divides a chamber 223 into upper and lower compartments. The upper compartment is exposed to the inlet manifold vacuum (e.g. by connection to the port 26 shown in FIGS. 13 and 14). The air compressor 215 supplies its output to the lower compartment of the chamber 223 and also to the upper compartment of a chamber 224 of the valve 216, divided by a resilient diaphragm 225, the lower compartment of the chamber 224 being exposed to atmosphere. The diaphragm 225 is biased by a spring 226 to close an orifice from the upper compartment of the chamber 224 leading to an air supply conduit 227 connected to supply air to the injector devices 211. A bleed passage 228 permanently connects the upper compartment of the chamber 224 with the conduit 227.

The system illustrated in FIG. 23 operates as follows. With the engine stationary the valves 205, 206, 208 and 216 are closed and it will be assumed that valves 212 and 213 are open. On starting the engine with the throttle valve 14 (FIGS. 13 and 14) closed, the inlet manifold vacuum causes the diaphragm 222 to unseat the valve members 217 and 219 so that fuel from the impeller passes via valves 206 and 208 to the injector devices 211. The injector devices 211 are also supplied with air from the compressor 215, the air passing from the upper compartment of chamber 224 via the bleed passage to the air supply conduit 227. As the throttle is opened, the fuel pressure from the impeller 203 increases accordingly, thus increasing the fuel supply to the metering control valve 205 with increasing engine speed, and the metering control valve opens with decreasing inlet manifold vacuum to increase the fuel supply to the injector devices 211. When the throttle is opened, the engine air intake flow increases and the inlet manifold vacuum is decreased and may be destroyed; thus the upper compartment of the chamber 223 is exposed to an increase in pressure which tends to close the valves 206 and 208. However, the lower compartment of the chamber 223 is exposed to the output pressure from the air compressor 215 which, when the engine is running, maintains the valves 206 and 208 open.

The purpose of the valves 212 and 213 is as follows.

The valve 212 comprises a resilient bellows 229 located in a chamber 230 exposed to the engine inlet manifold air intake so that the bellows 229 expands and contracts with changes in that air pressure. From the bellows 229 depends a valve member 231 co-operable with an orifice 232 through which fuel flows from the gas and air separator 207 to the valve 213. The valve 212 also includes a rod 233 manually operable against a spring 234 to cause the valve member 231 to close the orifice 232 whilst the rod 233 is operated. The restriction of the orifice 232 by the valve member 231 thus is automatically varied in dependence on the pressure of the air intake to the engine inlet manifold, so that the fuel by-passed from the gas and air separator to the fuel return line is varied in accordance with that air pressure, e.g. if the pressure decreases, i.e. air intake temperature increases, the valve member 231 opens and allows more fuel to be by-passed from the supply to the injector devices 211.

The manually operable member 233 can be used for starting the engine in cold conditions, when an enriched fuel supply to the injectors is desirable. Operation of the member 233 to cause the valve member 231 to close the orifice 232 prevents fuel being by-passed to the fuel return line and hence all the fuel is supplied to the injector devices 211 as long as the rod 233 is depressed.

The acceleration valve 213 is operable to provide an enriched fuel supply to the injector devices during acceleration conditions so that a quick response of the engine to opening of the throttle is obtained. The valve 213 comprises a plate valve 235 urged to a seated position by a spring 236. The plate valve 235 is connected by a rod 237 to a disc 238 forming the hub of a resilient diaphragm 239 dividing a chamber 240 into upper and lower compartments, the latter being exposed to the engine inlet manifold vacuum (e.g. by connection to port in FIGS. 13 and 14). The upper compartment contains a spring 242 bearing against the disc 238 which has a bleed aperture 243. Under steady throttle open conditions, the pressures on either side of the diaphragm 239 are equal, due to the bleed aperture 243, and the valve 235 is unseated permitting fuel flow from the valve 212 to the fuel return line. On further opening of the engine throttle, causing decrease in the engine inlet manifold vacuum, there results a pressure imbalance across the diaphragm 239 which flexes upwards causing seating of the valve 235 until the pressures across the diphragm 239 have equalised via the bleed aperture 243. Thus, when the engine throttle opening is increased, the fuel by-pass from the injector devices is temporarily cut-off, providing the injector devices with an enriched fuel supply so that a quick response to the throttle opening is obtained.

The fuel metering valves 13 (FIG. 13) and 213 (FIG. 22) may be replaced by a metering valve of the type described in my co-pending application Serial No. 330,965 filed December 16, 1963. In that valve the effective area of the metering orifice is controlled by a three-dimensional cam. The injector devices 9 and 211, instead of being constructed as shown in FIG. 20, preferably are constructed as shown in FIG. 25 or FIG. 25A.

In FIG. 24, there is illustrated a preferred embodiment of the invention, which has been utilised in saloon (sedan) cars of varying engine capacities and has been found to give very satisfactory performance.

The fuel circuit of the system shown in FIG. 24 comprises, as in the previous embodiments, a ring main having a supply branch 301 and a return branch 302, flow to the latter being controlled by a metering valve 303 in dependence on the engine inlet manifold vacuum. The metering valve is similar to that shown in FIGS. 17–19, as regards normal operation of the valve member by the main cam 48. However, the valve 303 does not incorporate the auxiliary cam 65 and its operating diaphragm 66 (although it could if required) and it does incorporate an acceleration response device, to be described, for temporarily supplementing fuel supply in response to rapid throttle opening. The valve 303 is shown in greater detail in FIG. 14. A priming pump 304A driven by an electric motor 304 supplies fuel from a tank 305 to a fuel line via a check valve 306 which prevents draining of the main during engine shutdown. From the check valve 306, the fuel passes to a relief valve 307 which is set to maintain a standing line pressure of convenient level, for example about 3 p.s.i. Surplus fuel is returned from the relief valve to the tank 305. From the relief valve the fuel passes to an engine driven impeller 308 which raises the fuel pressure in dependence on engine speed and passes the fuel via a check valve 309, which removes some or all of the standing 3 p.s.i., to a pair of flow restrictors 310, 311 which determine the amount of fuel flowing to the branch 301 of the fuel main. The branch 301 contains a fuel manifold connected by flow equalising restrictors 312 to the fuel inlets 333 of respective injector devices 334, shown in FIG. 13 and described in greater detail in my co-pending application Serial No. 434,417 filed February 23, 1965. From the fuel inlet 333, fuel passes through a guide tube 335 which terminates just short of the outlet orifice 336 of the injector device. The metering valve 303, as mentioned previously, controls the amount of fuel supplied to the injector devices in dependence on the engine inlet manifold pressure and hence the injectors receive fuel in dependence on engine speed (due to the impeller 308) as well as on engine loading.

From the metering valve 303, fuel is passed to the return branch 302 and pumped back to the tank 305, via a collection tank 313 and air balance valve 314, by a scavenge pump 304b, also driven by the electric motor 304.

Of the flow restrictors 310 and 311, restrictor 310 has a resilient bellows partly filled with inert gas and exposed on the exterior to atmospheric conditions. The restrictor 310 adjusts the fuel flow to the branch 301 in dependence on atmospheric pressure and temperature. The restrictor 311 is normally closed but can be opened, either manually or automatically, by a control 315 to supplement the fuel supply for cold starting and warming up.

The metering valve 303 incorporates an acceleration response device of the type described in greater detail in my co-pending application Serial No. 439,698 filed March 15, 1965. The cylinder 316 of the metering valve is connected by a passage 317 to a compartment 318 exposed to the engine inlet manifold vacuum and connected by a restrictor 319 to another compartment 320 divided from the compartment 318 by a resilient diaphragm 321 which, under steady state conditions closes a port 322 exposed to the atmosphere. In the absence of the diaphragm controlled port 322, opening of the engine throttle would cause the inlet manifold pressure to increase quickly towards atmospheric but, since the connection between the manifold and cylinder 316 incorporates a length of piping, there would be an undesirable lag in response of the metering valve piston 323 to the throttle opening. With the arrangement described, under steady state conditions, there is no pressure differential across the diaphragm 321 so that the latter is seated. If now the engine throttle is opened quickly, the inlet manifold pressure increases quickly towards atmospheric giving rise to a slower increase in pressure in the compartment 318. Due to the restrictor 319 the pressure change in the compartment 320 lags that in the compartment 318 and the resultant pressure difference in the two compartments unseats the diaphragm exposing the compartment 318 and cylinder 316 to atmospheric pressure so that the piston 323 makes a rapid stroke to the position corresponding to full throttle opening, i.e. the valve member of the meter if valve 303 closes, thereby supplementing the full supply to the injector devices. As the pressures on either side of the diaphragm 321 become equalised, the diaphragm returns to its seated position and the piston 323 takes up a position corresponding with the new inlet manifold vacuum, and the fuel supply to the injector devices is adjusted accordingly.

The above described sequence of operation is very rapid, typically it takes place in less than half a second. The change in manifold vacuum required to initiate the operation can be predetermined by the strength of the seating spring of the diaphragm 321 and the duration of the dwell of the piston 323 in the full throttle position can be adjusted by variation of the restrictor 319. The device can be arranged to operate only over desired ranges of vacuum change, e.g. it can be made to operate for an inlet manifold vacuum change of 4 inches Hg from 18–14 inches but not for changes from 14–10 inches or from 10–6 inches etc.

The atomising air supply to the injector devices 334 is obtained from an engine operated diaphragm pump 324 or a compressor. The output from the pump 324 operates an air presure switch 325 which controls the operation of the fuel pump 304. In the dead engine position, the centre contact 326 of the switch 325 makes with the lower contact 327 and operation of the engine starter switch energises the fuel pump motor 304. The first few strokes of the air pump 324 lift the diaphragm 328 of the switch 325 and the centre contact 326 is moved so that it makes with an upper contact 329, through which the fuel pump motor 304 continues to be energised. Continued increase in air pressure, for example to about 3 p.s.i., lifts the diaphragm 328 until the disc valve 330 of the switch 325 is unseated allowing the air to pass on to a manifold 331 connected to the air inlets 337 of the respective injector devices 334. On entering an injector device, the air passes through the annular space 338 between the fuel guide tube and the nozzle tube entraining the fuel issuing from the fuel guide tube 335 and carrying it through the outlet orifice 336 as a fine spray.

The outlet orifices of the injector devices 334 are located in the respective induction ports or inlet tubes of the engine and so are subject at times to inlet manifold vacuum depression which must not be allowed to affect fuel flow through the injector devices. A vacuum relief valve 332 connected in the air supply line to the air manifold 331 ensures that the lowest air manifold pressure is atmospheric, but that pressure can rise to the supply pressure from the air pump 324 which would tend to oppose and hence reduce the fuel flow to the injector devices. In order to eliminate this effect, and maintain balanced fuel flows throughout the system, fuel flows at all points in the system is opposed by the supply pressure of the air pump 324. This result is obtained by feeding the air supply pressure from the air pump to the relief valve 307 and to the air balance valve 314, as indicated in FIGS. 23 and 24.

The construction of the injector device illustrated in FIG. 25 can advantageously be modified, in the manner shown in FIG. 25A, by inclusion of a flow restrictor 312A adjacent the outlet end of the fuel tube 335, instead of the restrictor 312 in the fuel line connected to the fuel inlet 333 of the injector device as shown in FIG. 24. By use of the construction shown in FIG. 25A, the fuel emerges from the fuel tube 325 as a fine jet which can be accurately directed through the orifice 336 with a minimum of diffusion.

There are shown in FIGS. 26–33 suitable practical constructions of certain of the component parts shown diagrammatically in the preceding figures.

FIG. 26 shows a practical construction of the metering valve 303 forming part of the system shown in FIG. 24. The metering valve will be seen to have the same construction as that shown in FIGS. 17–19, except for the omission of the auxiliary cam 65 and its associated operating diaphragm 66. Thus, components of the valve shown in FIG. 26 similar to those of the valve shown in FIGS. 17–19 are given like references, their manner of cooperation being fully described with reference to FIGS. 17–19.

In addition to the components common to FIGS. 17–19, the metering valve shown in FIG. 26 incorporates an acceleration response device for temporarily supplementing fuel supply to the injector devices when the engine throttle is suddenly opened. This arrangement has already been described with reference to the valve 303 shown in FIG. 24 but this description will be repeated for clarity. The chamber 32 has a vent 400 to atmosphere and also has a dependent tubular member 401 the lower end of which normally is closed by a resilient diaphragm 402 extending across a chamber, the upper compartment 403 of which surrounds the member 401. The lower compartment 404 of the chamber contains a spring 405 urging the diaphragm against the member 401 and a restrictor (not shown but equivalent to the restrictor 319 in FIG. 24), interconnects the compartments 403 and 404 so that normally no pressure differential exists across the diaphragm 402. The compartment 403 also is connected by a conduit 406 to the port 64 which is connected to the inlet manifold of the engine. Thus, if the engine throttle control is opened rapidly, engine inlet manifold pressure increases towards atmospheric pressure, but there is some delay in the full effect of the pressure change being transmitted to the piston 58. However, this delay is compensated by reason of the conduit 406 connecting the port 64 to the compartment 403. A rapid increase in inlet manifold pressure causes a pressure imbalance across the diaphragm 402 which flexes and unseats from the tubular member 401 so that the piston 58 is exposed to atmospheric pressure via compartment 403, conduit 406 and port 64. The piston 58 thus moves to the position shown in FIG. 26 causing rotation of the metering aperture 37 to block communication between fuel ports 45 and 47, thereby boosting the fuel supply to the injector devices. Due to the restrictor connecting the compartments 403 and 404, the pressures on either side of the diaphragm 402 are gradually equalised and the piston 58 adopts a new steady state position as previously explained with reference to the valve 303 in FIG. 24.

In FIG. 27 there is shown a practical form of the engine driven impeller shown in FIGS. 13, 24 and 26, and used to vary the fuel pressure in the supply line of the ring main in dependence on engine speed. The impeller has a driving pulley 501, driven by a V-belt from the engine, although direct drive can be used. The pulley 501 is mounted at the end of a spindle 502 carried by a prepacked ball-bearing assembly 503. At its inner end the spindle 502 carries a rotor 504 having circumferential radial vanes 505 and which is mounted in a shallow cylindrical housing 506. One end face 507 of the housing 506 has an annular groove 508, registering with the vanes 505, which describes an arc of about 305° around the face 507. One end of the groove 508 is connected to a fuel inlet 509 and the other to a fuel outlet 510. Rotation of the pulley 501 and the rotor 504 results in the vanes 505 sweeping fuel entering the inlet 509 around the groove 508. At the outlet end of the groove the velocity energy of the fuel is converted to pressure energy which forces the fuel through the outlet 510. Thus, the fuel pressure at the outlet of the impeller is dependent on the rotor speed and hence the engine speed. Typically, the spindle 502 is about 2½ inches long and the impeller has a delivery rate, under engine idling conditions, of about 15 gallons per hour. The construction of the impeller thus is seen to be simple but efficient, and no precision components are necessary.

Figure 28:
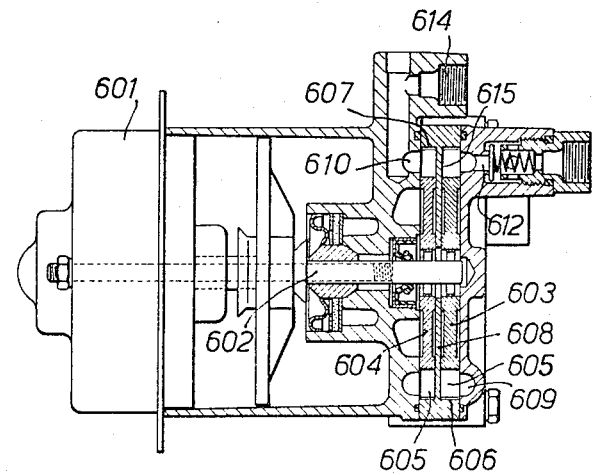
Figure 29:
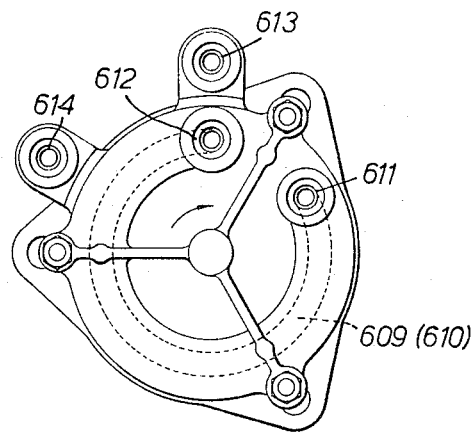

The combined fuel priming pump and scavenge pump utilised in the systems shown in FIGS. 13, 23 and 24 can be simply constructed, as illustrated by FIGS. 28 and 29. The unit has an electric driving motor 601 which rotates a spindle 602 carrying at its outer end two rotors 603 and 604 having radial vanes 605 and rotatable in shallow cylindrical chambers 606, 607 defined in a housing having a central radial web 608 dividing the chambers 606 and 607 from one another. One end face of the housing has an annular groove 609 whilst the opposite end face has an annular groove 610, each extending over an arc of about 305°. The ends of the groove 609 communicate with respective fuel inlet and outlet ports 611 and 612 whilst the ends of the groove 610 communicate with respective fuel inlet and outlet ports 613 and 614. The operation of these two pumps is similar to that already described with reference to FIG. 26. The rotor 603 acts as the fuel priming pump whilst the rotor 604 acts as the scavenge pump.

The web 608 has a bleed aperture 615 enabling fuel from the priming pump to bleed into the scavenge pump so that the rotor 604 does not bleed dry, which otherwise it could do since the scavenge pump does not, for most of the time, run at full capacity.

The outlet 612 also incorporates a check valve 616, seated by a spring 617, this valve being equivalent to the check valve 306 shown in FIG. 24.

Figure 30:
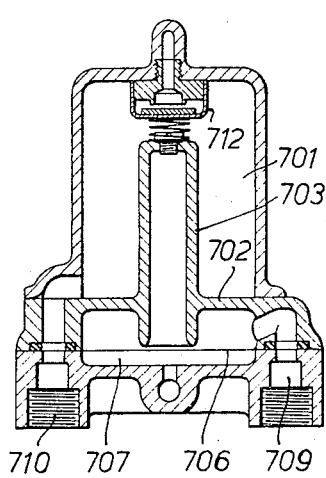
Figure 31:
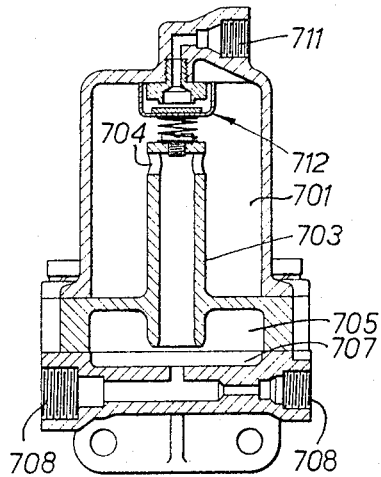

FIGS. 30 and 31 illustrate a suitable practical construction of the collection chamber, and its associated air balance valve, connected in the return branch of the fuel supply ring main in the systems as shown in FIGS. 13, 23 and 24. The collection chamber 701 has a floor 702 through which extends a conduit 703 open at its lower end and closed at its upper end, there being apertures 704 in the wall of the conduit adjacent the upper end. The lower end of the conduit 703 extends into the upper compartment 705 of a chamber divided by a resilient diaphrgam 706, the lower compartment 707 of the chamber communicating with ports 708 for connection to the atomising air supply line so that the underside of the diaphragm 706 is exposed to the atomising air pressure. A fuel inlet port 709 leads to the compartment 705 and fuel not supplied to the injector devices and flowing in the fuel return branch passes via port 709, compartment 705 and conduit 703 to the chamber 701, this flow being opposed by the atomising air pressure acting on the diaphragm. The chamber 701 has a fuel outlet port 710 for connection to the scavenge pump to return fuel from the chamber 701 to the fuel tank.

The chamber 701 has a vent 711 to atmosphere and an anti-surge valve 712 prevents escape of fuel through the vent 711 should surge of fuel in the chamber 701 occur.

Figure 32:
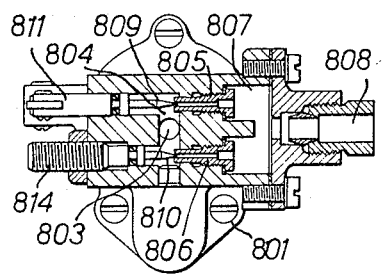
Figure 33:
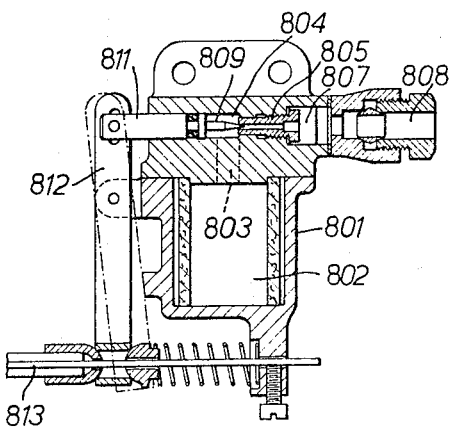

FIGS. 32 and 33 show a suitable construction of the valves 310 and 311 illustrated in FIG. 24, the two valves being combined in a single housing.

The combined valve has a housing 801 and a common fuel inlet connected to a filter chamber 802 from which a passage 803 leads to a chamber 804 from which a pair of orifice members 805 and 806 lead to a chamber 807 communicating with a common outlet 808. Needle valves 809 and 810 are arranged for co-operation with the orifices of the members 805 and 806, respectively, to control liquid fuel flow through them to the outlet 808.

The needle valve 809 constitutes the cold start device and is carried by a shaft 811 extending to the exterior of the housing 801 where it is connected to one end of a swing arm 812, the other end of which is connected to a cable 813 operable by the usual choke control.

The needle valve 810 constitutes the atmospheric pressure compensation valve and is connected to a screw 814 for preset adjustment in dependence on the atmospheric conditions likely to be encountered by the engine. However, the needle valve 810 could be connected for operation by a pressure sensitive device, as indicated by FIG. 24, if substantial variations in atmospheric pressure are likely to be encountered during operation of the engine.

In each of the above described embodiments shown in FIGS. 13, 23 and 24, the fuel supply manifold is connected to the individual fuel injector devices by flow equalising restrictors. In FIG. 25A, such restrictors form an integral part of the nozzle of each injector device. These restrictors preferably consist of short drawn stainless steel hypodermic tubes. The tubes are extremely accurately drawn so that their internal dimensions are maintained to a very close tolerance. Flow through the tubes is a function of the tube length and diameter and, since the diameters of the tubes can be made accurately constant, the flow characteristics of the tubes can be adjusted to within ±1 percent, by varying the tube length. This form of restrictor has been found to enable greater accuracy of flow characteristic to be obtained than is possible using bored pets.

The fuel injection systems described above, and in particular that shown in FIG. 24, provide efficient fuel injection at low pressure and utilise components that are amenable to economic mass production, since precision components are reduced to a minimum. The injector devices are of particularly simple construction and do not utilise any moving parts, yet operate to atomise the fuel in a simple and efficient manner. The fuel supply to the injectors is regulated in dependence on engine speed and the fuel supplied is varied in dependence on engine air intake flow, for example in response to engine inlet manifold pressure or throttle control position and may also be varied in dependence on other parameters. Fuel is circulated continuously around a ring main and at all points in the flow circuit is opposed by atomising air pressure, thus providing balanced flow conditions and ensuring that fuel supply pressure always exceeds that of the atomising air. The possibility of sub-atmospheric conditions arising in the injector devices, which would impair fuel injection, is avoided by the use of a vacuum relef valve in the atomising air supply line.

The fuel injection systems described can be used in a wide range of engines without modification. For engines having a volumetric efficiency that does not vary much with speed, the primary metering control can be dependent on engine inlet manifold pressure alone, and an injection system such as shown in FIG. 24 has been found suitable for use in engines having power outputs between 50 and 350 B.H.P. with only minor modifications.

Instead of controlling the metering valve in dependence on engine inlet manifold pressure, a simple control by direct coupling to the throttle control can be used in certain racing cars, for example. In addition, a metering valve controlled by, for example, both engine speed and engine throttle control, or inlet manifold pressure, could be used. An example of such a valve is to be found in my aforementioned copending application Serial No. 330,965.

Having described the invention in connection with certain specific embodiments thereof, it is to be understood that further modifications may now suggest themselves to those skilled in the art, and it is intended to cover such modifications as fall within the scope of the appended claims.

I claim:

1. A low pressure continuous fuel injection system for an internal combustion engine, including a fuel circulation conduit system having supply and return branches; a plurality of open air-atomising injection devices, each of said injector devices including a chamber communicating with an open outlet orifice; means connecting the said supply branch to the injector devices for delivery of fuel to the said chambers of the respective injector devices; the said fuel conduit system including fuel metering means responsive to engine operating parameters including engine operating speed and engine air intake to supply fuel to said injector devices in dependence on said operating parameters; said fuel metering means including a fuel pressurising device adapted to be driven by said engine to pressurise fuel flow through said supply branch in dependence on engine operating speed, and fuel metering valve means the position of which is dependent upon said engine air intake parameter, said fuel pressurising device and fuel metering means being associated to conjointly meter the flow of fuel to said injector devices in dependence on both said engine speed and said engine air intake parameter; a fluid pressure responsive balance valve connected in said return branch and provided with an air receiving chamber closed against communication with said return branch; air pumping means for supplying low positive pressure atomising air to said chambers of the injector devices for entraining fuel therein and discharge thereof through said outlet orifices at low pressure, and to the air receiving chamber of said fluid pressure responsive balance valve for control thereof such that fuel flow through said return branch is opposed by said atomising air pressure in compensation for said atomising air pressure supplied to said injector devices whereby fuel flows to said injector devices and in said return branch are equally opposed by said atomising air pressure.

2. A fuel injection system according to claim 1, in which said fuel metering valve means comprises actuating means responsive to engine operating speed and actuating means operable in response to engine air intake flow, a metering valve member, and means coupling both said actuating means to said valve member for operation thereof to adjust said variable orifice and fuel flow to said injector devices.

3. A fuel injection system according to claim 1, in which said fuel metering valve means includes a valve member adjustable in position to change the area of a metering orifice, and actuating means operable in response to engine air intake to adjust the position of said valve member and fuel flow to said injector devices.

4. A low pressure continuous fuel injection system for an internal combustion engine having an air intake manifold structure, including a fuel circulation conduit system having supply and return branches; a plurality of open air-atomising injector devices, each of said injector devices including a chamber communicating with an open outlet orifice disposed in said manifold structure and exposed to vacuum conditions therein; means connecting said supply branch to the injector devices for delivery of fuel to the said chambers of the respective injector devices; the said fuel conduit system including fuel metering means responsive to engine operating parameters including engine operating speed and engine air intake to supply fuel to said injector devices in dependence on said operating parameters; said fuel metering means including a fuel pressurising device adapted to be driven by said engine to pressurise fuel flow through said supply branch in dependence on engine operating speed, and fuel metering valve means the position of which is dependent upon said engine air intake parameter, said fuel pressurising device and fuel metering means being associated to conjointly meter the flow of fuel to said injector devices in dependence on both said engine speed and said engine air intake parameter; a fluid pressure responsive balance valve connected in said return branch and provided with an air receiving chamber closed against communication with said return branch; atomising air conduit means connected to said injector devices in communication with said chambers of the injector devices and to the air receiving chamber of said fluid pressure responsive balance valve; air pumping means for supplying low positive pressure atomising air to said air conduit means for delivery to said injector devices for mixing therein with fuel prior to discharge thereof at low pressure through said outlet orifices, and to said fluid pressure responsive balance valve device for control thereof such that fuel flow through said return branch is opposed by said atomising air pressure in compensation for said atomising air pressure supplied to said injector devices whereby fuel flows to said injector devices and in said return branch are equally opposed by said atomising air pressure; and a vacuum relief valve device connected to said atomising air conduit means at a location upstream of said injector devices to prevent any said vacuum conditions in said manifold structure resulting in sub-atmospheric pressure conditions in said chambers of the injector devices.

5. A fuel injection system according to claim 4, in which said fuel pressurising device includes a fuel pressurising pump having a single rotary pumping member adapted to be driven by said engine to pressurise fuel flow through said supply branch and to said injector devices in dependence on engine operating speed.

6. A fuel injection system according to claim 4, in which said fuel metering valve means includes a metering valve member operable to control the area of a metering orifice, actuating means operably responsive to engine air intake flow, and means operably coupling said actuating means to said metering valve member for operation thereof in response to changes in said air intake flow.

7. A fuel injection system according to claim 4, in which said means connecting said supply branch to the injection devices includes flow equalising restrictors for the respective injector devices.

8. A low pressure continuous fuel injection system for an interial combustion engine having an inlet manifold structure, including a fuel ring main having supply and return branches; open air-atomising injector devices having open outlet orifices disposed in said manifold structure; means connecting said supply branch to said injector devices; the said supply branch including a pump device adapted to be driven by said engine to pressurise fuel in said supply branch in dependence on engine speed; the ring main including a fuel metering valve device operably responsive to engine air intake flow, constituting an engine operating parameter, to adjust fuel supply to the injector devices in dependence on the said parameter; said fuel metering valve device including a chamber having a piston member slidably mounted therein, means communicating said chamber with said inlet manifold structure for exposing the said piston member to inlet manifold vacuum representative of engine air intake flow, a rotatable metering valve member, a pivoted cam member, cam follower means engaging said cam member and connected with said metering valve member whereby pivotal movement of said cam member causes rotation of said valve member, and means linking said piston member and said cam member whereby sliding movement of said piston member in said chamber pivots said cam member; the said ring main further including engine acceleration response means responsive to sudden decreases in said manifold vacuum to supplement temporarily the fuel supply to the injector devices; a fluid pressure responsive balance valve in said return branch of the fuel ring main; air pumping means for supplying low pressure atomising air to said injector devices to entrain and discharge liquid fuel substantially at said atomising air pressure and to said balance valve to operate said balance valve whereby fuel flow in both the supply and return branches of said ring main are opposed by said atomising air pressure; and vacuum relief valve means connected to said injector devices to ensure that air pressure therein is at least equal to atomspheric pressure under all engine operating conditions.

9. A fuel injection system according to claim 4, in which said fuel metering valve means includes a metering valve member operable to control the area of a metering orifice, first actuating means responsive to engine operating speed, second actuating means operably responsive to engine air intake flow, and means coupling both said actuating means to said metering valve member for operation thereof in response to changes in said air intake flow and/or changes in said engine speed.

10. A fuel injection system according to claim 9, in which said second actuating means is adapted for response to changes in engine throttle opening representative of changes in engine air intake flow.

11. A fuel injection system according to claim 4, in which said second actuating means is adapted for response to changes in engine inlet manifold vacuum representative of changes in engine air intake flow.

12. A fuel injection system according to claim 4, in which said fuel metering means includes a sleeve having inlet and outlet ports and a metering valve stem disposed in said sleeve and mounted for rotation therein to adjust the area of said inlet port that communicates with said outlet port and thereby adjust the area of said metering orifice, a cam member movable in two senses, a cam follower responsive to movement of said cam member in either of said senses to rotate the said metering valve stem, first actuating means responsive to engine operating speed, second actuating means responsive to a further engine operating parameter representative of engine air intake, means operably coupling said first actuating means to said cam member for movement thereof in one of said two senses in response to changes in said engine speed, and means coupling said second actuating means to said cam member for movement thereof in the other of said two senses in response to changes in said further engine operating parameter.

13. A fuel injection system as claimed in claim 4 wherein said fuel metering valve means includes a rotary metering valve member and a fluid pressure responsive movable member, means coupling said valve member and said movable member for rotation of the valve member to change the area of a metering orifice in response to movement of said movable member, and means communicating said movable member and said inlet manifold structure for exposing said movable member to inlet manifold vacuum representative of said engine air intake flow, whereby changes in said vacuum cause said movement of the said movable member.

14. A fuel injection system as claimed in claim 13, wherein said fuel metering valve means is located downstream of the injector devices and decreases in said inlet manifold vacuum causes rotation of said rotary metering valve member to decrease the area of said metering orifice.

15. A fuel injection system as claimed in claim 8, wherein said fuel metering valve device is located downstream of the injector devices, and in which operation of said acceleration response means in response to a said sudden decrease in inlet manifold vacuum temporarily exposes said metering valve piston member to atmospheric pressure thereby to cause rotation of the said metering valve member to restrict fuel flow through the said return branch of the fuel ring main thereby temporarily increasing fuel supply to said injector devices.

16. A low pressure continuous fuel injection system for an internal combustion engine having an inlet manifold structure, and a fuel reservoir, including a fuel ring main having supply and return branches, open air-atomising injector devices having outlet orifices disposed in said manifold structure, means connecting said supply branch to said injector devices, the said supply branch including a fuel pressurising pump device adapted to be driven by said engine to pressurise fuel in the supply branch in dependence on engine speed, the ring main including a fuel metering valve device operably responsive to engine air intake flow, constituting an engine operating parameter, to adjust fuel supply to the injector devices in dependence on the said parameter, a fuel collection chamber connected in the said return branch of the fuel ring main, a fluid pressure responsive valve device connected in said return branch upstream of said collection chamber, scavenge pump means connected in said return branch for returning fuel from the collection chamber to said fuel reservoir, air pumping means for supplying low pressure atomising air to said injector devices to entrain and discharge liquid fuel substantially at said atomising air pressure and to said fluid pressure responsive valve device whereby fuel flow in said supply branch of the fuel ring main and fuel flow to the said collection chamber in the return branch of the fuel ring main are opposed by said atomising air pressure, and vacuum relief valve means connected to said injector devices to ensure that pressure therein is at least equal to atmospheric pressure.

17. A fuel injection system as claimed in claim 16, and further including priming pump means for supplying fuel from said reservoir to said fuel pressurising pump device, wherein said scavenge pump means and said priming pump means each has a rotary pumping element mounted on a common driving shaft, and power means operably coupled to said driving shaft for rotation thereof.

18. A fuel injection system as claimed in claim 17, wherein said priming pump means and said scavenge pump means each comprises rotary ring pumping means, and wherein said rotary pumping elements each comprise a flat disc having a toothed periphery.

19. In an internal combustion engine having a fuel reservoir and an inlet manifold structure including passages leading to individual cylinders of said engine, a fuel injection system including a fuel ring main having supply and return branches, open air-atomising injector devices having outlet orifices disposed in said passages, means connecting said supply branch to said injector devices, fuel pressurising pump means connected in said supply branch adapted to be driven by the said engine to supply fuel to said injector devices at a pressure dependent on engine operating speed, a fuel metering valve device operably responsive to engine air intake flow, constituting an engine operating parameter, to adjust fuel supply from said supply branch to said injector devices in dependence on said parameter, a fuel collection chamber connected in said return branch of the ring main, fluid pressure responsive valve means connected in said return branch upstream of said collection chamber, scavenge pump means connected to pump fuel from said collection chamber to said fuel reservoir, atomising air pump means connected to supply atomising air at low positive pressure to said inejector devices to entrain and discharge fuel from said outlet orifices at substantially said atomising air pressure and to said fluid pressure responsive valve whereby fuel in said supply branch of the fuel ring main and to the said collection chamber said return branch are opposed by said atomising air pressure, vacuum relief valve means connected to said injector devices for ensuring that pressure therein maintained at least at atmospheric pressure, and engine acceleration response valve means connected in the said fuel ring main for temporarily restricting fuel flow through the return branch, and hence temporarily increasing fuel flow to said injector devices, in response to acceleration of said engine.

20. The combination claimed in claim 19, wherein the said metering valve device and said engine acceleration responsive valve device have a common valve member and a common operating member for said valve member, and means communicating said operating member with the said inlet manifold structure for exposure thereof to inlet manifold vacuum whereby said operating member is actuated in response to changes in said vacuum.

21. The combination claimed in claim 20, and including means coupling said operating member to said metering valve member a pivoted cam member, means linking said operating mmeber and said cam member whereby actuation of the operating member pivots the cam member, and cam follower means carried by said metering valve member and operably engaging said cam member whereby pivotal movement of the cam member adjusts the position of said metering valve member.

22. The combination claimed in claim 21, wherein said metering valve device is disposed downstream of said injector devices, and wherein said metering valve member is operable to restrict fuel flow to the said collection chamber in the return branch with increasing engine air intake and temporarily to cut-off said fuel flow in response to engine acceleration.

23. A low pressure continuous fuel injection system for an internal combustion engine having an inlet manifold structure, including a fuel ring main having supply and return branches, open air-atomising injector devices connected to said supply branch and having outlet orifices disposed in said inlet manifold structure, a pump device in said supply branch adapted to be driven by said engine for pumping fuel to said injector devices and for pressurising fuel in said supply branch in dependence on engine operating speed, the said ring main including a metering valve device controllable in response to engine air intake flow, constituting an engine operating parameter, for adjusting fuel flow to said injector devices in dependence on said parameter, a control valve device in the said supply branch downstream of the said pumping device, said control valve device having a valve member movable between first and second seated positions in which fuel flow from said pump device through said supply branch is cut-off, said control valve device further including control valve member operating means responsive to operation of said engine to prevent said control valve member occupying said first seated position but permitting it to occupy said second seated position and positions intermediate said first and second seated positions, said control valve member operating means being further responsive to engine inlet manifold vacuum whereby inlet manifold vacuum corresponding to engine operation under light loading and with engine throttle closed causes said control valve member to occupy said second seated position and whereby engine inlet manifold vacuum corresponding to other engine operating conditions causes said control valve member to occupy a position intermediate said first and second positions, a fluid pressure responsive balance valve device connected in the return branch of said ring main, pumping means for supplying atomising air at low pressure to said injector devices to entrain and discharge liquid fuel through said outlet orifices substantially at atomising air pressure and to said balance valve device whereby fuel flow in said supply and return branches is opposed by said atomising air pressure, and vacuum relief valve means connected to said injector devices to prevent subatmospheric pressures arising therein.

24. A fuel injection system as claimed in claim 23, including means exposing said control valve operating means to outlet pressure of said fuel pump device for response to engine operation.

25. A fuel injection system as claimed in claim 4, wherein said means connecting the injector devices to the said supply supply branch comprises respective flow equalising restrictors consisting of constant bore capillary tubes.

26. A fuel injection system as claimed in claim 4, and further including a fuel collection chamber in said return branch downstream of said balance valve device, said return branch further including a scavenge pump device for removing fuel from said collection chamber.

27. A fuel injection system as claimed in claim 4, wherein said fuel pumping and metering means includes override valve means responsive to engine inlet manifold vacuum whereby sudden decreases in said vacuum towards atmospheric pressure operates said override valve means temporarily to increase fuel supply to said injector devices.

28. A fuel injection system as claimed in claim 4, wherein said fuel metering valve means includes a rotary metering valve member, and means operably coupling said valve member to throttle control means of said engine comprising means for varying engine air intake flow, whereby operation of said throttle control means rotates said metering valve member correspondingly to adjust fuel supply to said injector devices.

29. A continuous low pressure fuel injection system for an internal combustion engine, having an inlet manifold structure including individual passages leading to individual engine cylinders, including
  (A) a plurality of open air atomising fuel injector devices each having fuel and atomising fluid inlets and an outlet orifice, said outlet orifices being disposed in said manifold structure passageways,
  (B) fuel circulation conduit means having supply and return branches, means connecting the fuel inlets of said fuel injector devices to said supply branch, said fuel supply branch including fuel metering valve means and means for adjusting the pressure of fuel flow through the metering valve means in dependence on engine operating speed, said fuel return branch including fluid pressure responsive pressure balance valve means,
  (C) said metering valve means including a metering valve member, a cam member movable in two senses, a cam follower coupling said cam member to said valve member for movement thereof in response to said movements of the cam member to adjust fuel flow along the supply branch of said fluid conduit means to said injector devices, first actuating means comprising a double-sided pressure responsive movable member, means coupling said movable member to said cam member for movement of the cam member in one of said two senses, means communicating said movable member with said supply branch whereby one side of said movable member is exposed to fuel pressure in said supply branch as determined by said fuel pressure adjusting means to cause movement of said cam member in said one sense in response to changes in said fuel pressure, second actuating means operable by engine air intake flow control means, and means coupling said second actuating means to said cam member for movement thereof in the other of said two senses in response to operation of said flow control means, whereby said metering valve member is operated in response to engine operating speed and said engine air intake flow control means,
  (D) atomising fluid supply conduit means connected to said atomising fluid inlets of said injector devices, and to said fluid pressure responsive pressure balance valve, and means for supplying low pressure atomising fluid to said atomising fluid conduit means for delivery to said injector devices and mixing with fuel prior to discharge thereof through the outlet orifices of the injector devices, and for delivery to said fluid pressure responsive pressure balance valve whereby fuel flows in said supply and return branches are opposed by atomising fluid pressure.

30. A fuel injection system according to claim 29, in which said metering valve means includes a chamber and in which said movable member is a resilient diaphragm extending across said chamber, said chamber on one side of the resilient diaphragm forming part of said fuel conduit means, and in which said air conduit means communicates with said chamber on the opposite side of said diaphragm.

31. A fuel injection system according to claim 29, in which said means coupling said movable member and said cam member includes linkage means for magnifying said movements of said movable member.

32. A fuel injection system according to claim 29, in which said metering means includes first and second resilient diaphragms and a chamber, said first diaphragm comprising said movable member and said second diaphragm dividing said chamber into first and second regions, a pressurised fluid inlet in said first region and an aperture in said second region, means including an orifice interconnecting the first and second regions of said chamber, a control valve member for controlling fluid flow through said orifice, means directly coupling said second diaphragm to said cam member for movement thereof in said one sense in response to flexure of said second diaphragm, a movement amplifying resilient linkage coupling said control valve member to said second diaphragm whereby said control valve member is so positioned to control fluid flow through said orifice and said aperture that there is normally pressure balance across said second diaphragm, means coupling said first diaphragm to said control valve member such that flexural movement of said first diaphragm causes movement of said control valve member thereby producing pressure unbalance across said second diaphragm and movement of said resilient linkage to effect amplified flexure of said second diaphragm and re-adjustment of said control valve member to restore pressure balance across said second diaphragm.

33. A fuel injection system according to claim 32, in which said first diaphragm divides a further chamber into first and second regions, said fuel circulation conduit means including said first region of the further chamber, and said atomising fluid conduit means communicating with said second region of the further chamber.

34. A fuel injection system according to claim 4, in which said fuel pressurising device means comprises a relief valve adapted to be driven by said engine and to open at a pressure dependent on engine operating speed, and means connecting said relief valve between said supply and return branches of the fuel conduit system.

35. A fuel injection system according to claim 4 in which said fuel metering valve means includes a metering valve member, means coupling said valve member to a resilient diaphragm whereby flexure of said diaphragm operates said valve member, means communicating said supply branch of the fuel conduit system with one side of said diaphragm for exposure thereof to said fuel pressure in said supply branch whereby to flex said diaphragm and operate said valve member in dependence on said engine operating speed, means communicating said return branch of said fuel conduit means with the other side of said diaphragm to expose it to fuel pressure in said return line, actuating means responsive to engine throttle control constituting means for adjusting engine air intake flow, and means coupling said actuating means to said metering valve member for operation thereof in response to said engine air intake flow.

36. A fuel injection system according to claim 4, in which the metering valve means includes a chamber, a resilient diaphragm dividing said chamber into first and second regions, said first region forming part of said supply branch of said fuel circulation conduit system, said second region of said chamber having a metering orifice, means connecting said metering orifice to said injector devices, means interconnecting said first and second regions of said chamber to maintain a constant pressure drop across said diaphragm, a valve member, means coupling said valve member to said diaphragm whereby flexure thereof moves said valve member to control fuel flow through said orifice, means connecting said orifice to said injector devices to supply fuel thereto, and means for flexing said diaphragm in dependence on said engine operating speed and engine air intake flow.

37. A fuel injection system according to claim 4 in which said metering valve means includes a valve member, means for operating said valve member in response to engine operating speed and engine air intake flow constituting a further engine operating parameter, a chamber, a resilient diaphragm dividing said chamber into first and second regions, said supply branch of said fuel circulation conduit system including said first region of the chamber, means connecting said second region to said injector devices, means connecting said valve member across said first and second regions of the chamber to control fuel flow from said first to said second region, a further valve member, means connecting said further valve member to said diaphragm for controlling fuel flow from said second region of the chamber to said injector devices, and resilient means acting on said diaphragm for adjustment of said further valve member to maintain a constant pressure drop across said first mentioned valve member.

38. A fuel injection system according to claim 4, in which said fuel metering valve means comprises first and second valve devices, a chamber, a resilient diaphragm dividing said chamber into first and second regions, said supply branch of said fuel circulation conduit system including said first region, and said second region of the chamber having an orifice, flow path means connecting said orifice to said injector devices, further flow path means including said first valve device connecting said orifice and said balance valve in the return branch of said fuel circulation conduit system, means connecting said second valve device to said diaphragm for controlling fuel flow through said orifice in response to flexural movement of said diaphragm, resilient means acting on said diaphragm for maintaining constant fuel flow through said orifice, and means responsive to engine operating speed and engine air intake flow for operating said first valve device to adjust the fuel flow from said orifice to said injector devices.

39. In an internal combustion engine having an inlet manifold structure including passageways leading to respective cylinder inlet ports of said engine and having fuel reservoir means, a low pressure continues fuel injection system including a fuel ring main having supply and return branches, open air-atomising injector devices having outlet orifices disposed in said inlet manifold passageways, means connecting said injector devices to said supply branch, said ring main including fuel pumping and metering means adapted for response to engine operating parameters comprising engine operating speed and engine air intake flow to supply fuel to said injector devices in dependence on said parameters, said fuel pumping and metering means including a metering valve device having a cam operated rotary valve member and inlet and outlet ports, said rotary valve member being operable to vary the area of said inlet port in communication with said outlet port, said return branch including a fluid pressure responsive balance valve device, air pumping means for supplying low positive pressure atomising air to said injector devices for entraining liquid fuel therein and discharging such fuel from the outlet orifices thereof at substantially atomising air pressure and to said balance valve device whereby fuel flows in said supply branch and said return branch are opposed by said atomising air pressure, and vacuum relief valve means connected to said injector devices for maintaining pressure therein at least equal to atmospheric pressure.

40. The combination claimed in claim 39, wherein the said fuel pumping and metering means includes a fuel pressurising pump device connected in said supply branch of the fuel ring main and adapted to be driven by said engine for pressurising fuel for supply to said injector devices in dependence on said engine operating speed, means operably responsive to engine inlet manifold vacuum, constituting a parameter related to engine air intake flow, for operating said cam operated metering valve member in response to said parameter.

41. The combination claimed in claim 40, wherein said means operably responsive to engine inlet manifold vacuum comprises a slidable operating member, means communicating said operating member to the said engine inlet manifold structure for exposure to said engine inlet manifold vacuum whereby changes in said vacuum effect sliding movement of said operating member, means linking said operating member and the cam of said cam operated valve thereby sliding of said operating member moves said cam to rotate said valve member.

42. The combination claimed in claim 41, wherein said slidable operating member is a piston member and said cam a pivoted cam.

43. The combination claimed in claim 40, wherein said supply branch of the fuel ring main includes priming pump means for supplying constant low pressure fuel from said fuel reservoir to said fuel pressurising pump device, wherein said return branch of the fuel ring main includes a fuel collection chamber located downstream of said balance valve device, and a scavenge pump device for returning fuel from said collection chamber to said fuel reservoir.

44. The combination claimed in claim 39, wherein said metering valve device is disposed in said return branch of the fuel ring main upstream of said balance valve.

45. The combination claimed in claim 39, wherein said fuel ring main includes an atmospheric pressure responsive valve device for adjusting fuel flow to said injector devices in dependence on atmospheric pressure.

46. In an internal combustion engine having an inlet manifold structure including passageways leading to cylinder inlet ports of said engine and including a fuel reservoir, a continuous low pressure fuel injection system having a fuel ring main including supply and return branches; open air-atomising injector devices having outlet orifices disposed in said inlet manifold passageways, means connecting said supply branch to said injector devices; a fuel collection tank located in said return branch; said ring main including fuel pumping means for circulating fuel in said ring main and for supplying fuel to said injector devices; said pumping means including fuel pressurising pump means in said supply branch adapted to be driven by the said engine for pressurising fuel in said supply branch for supply to said injector devices in dependence on engine operating speed, priming pump means for supplying fuel at constant low pressure from said fuel reservoir to said pressurising pump means, and scavenge pump means for returning fuel from said collection chamber to said fuel reservoir; said fuel ring main including a fuel metering valve means having inlet and outlet ports, a rotary metering valve member operably to vary the area of said inlet port communicating with said outlet port, a pivoted cam member operably coupled to said metering valve member for rotation thereof, a movable operating member, means communicating said operating member and said inlet manifold structure whereby changes in inlet manifold vacuum representative of changes in engine air intake flow cause movement of said operating member, means linking said operating member and said cam whereby movement of said operating member pivots said cam to rotate said metering valve member; fluid pressure responsive balance valve means in said return branch of the fuel ring main located upstream of said collection chamber; air pumping means connected to supply low pressure atomising air to said injector devices to entrain liquid fuel therein and to discharge such fuel from the outlet orifices thereof and to said balance valve means whereby fuel flow through supply branch to said injector devices and through said return branch to said collection chamber are opposed by said atomising air pressure; and vacuum relief valve means connected to said injector devices for preventing subatmospheric pressures arising therein.

47. The combination claimed in claim 46, wherein said means connecting the supply branch to the injector devices includes respective constant bore capillary tubes constituting flow equalising devices.

48. The combination claimed in claim 46, wherein said metering valve means includes a pressure differential responsive device operable in response to sudden decreases in inlet manifold vacuum, corresponding to acceleration of said engine, temporarily to move said movable operating member in a direction causing rotation of said metering valve member to increase the fuel supply to the injector devices.

49. The combination claimed in claim 46, wherein said metering valve means is disposed in the fuel ring main downstream of said injector devices and upstream of said balance valve means.

References Cited by the Examiner
UNITED STATES PATENTS

| | | | |
|---|---|---|---|
| 2,136,959 | 11/1938 | Winfield | 123—139.17 X |
| 2,378,036 | 6/1945 | Reggio | 123—140.31 X |
| 2,803,233 | 8/1957 | Demtchenko | 123—139.17 |
| 2,813,522 | 11/1957 | White et al. | 123—119 |
| 2,893,364 | 7/1959 | Elliott et al. | 123—119 |
| 2,957,464 | 10/1960 | Dolza | 123—119 |
| 3,181,519 | 5/1965 | Dolza | 123—119 |

MARK NEWMAN, *Primary Examiner.*

LAURENCE M. GOODRIDGE, *Examiner.*